US010740822B1

(12) United States Patent
Bebawy et al.

(10) Patent No.: US 10,740,822 B1
(45) Date of Patent: Aug. 11, 2020

(54) USING DATA ANALYSIS TO CONNECT MERCHANTS

(71) Applicant: Square, Inc., San Francisco, CA (US)

(72) Inventors: Ramy Bebawy, San Francisco, CA (US); Philip Zigoris, San Francisco, CA (US); Yongxue Qi, San Francisco, CA (US); Yu-Shan Fung, Los Altos, CA (US); Riley Crane, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 568 days.

(21) Appl. No.: 15/383,891

(22) Filed: Dec. 19, 2016

(51) Int. Cl.
G06Q 30/06 (2012.01)
G06Q 20/20 (2012.01)
G06Q 30/02 (2012.01)

(52) U.S. Cl.
CPC ....... *G06Q 30/0631* (2013.01); *G06Q 20/202* (2013.01); *G06Q 30/0224* (2013.01); *G06Q 30/0238* (2013.01)

(58) Field of Classification Search
CPC combination set(s) only.
See application file for complete search history.

(56) References Cited

U.S. PATENT DOCUMENTS 6,003,013 A 12/1999 Boushy et al.
6,266,649 B1 7/2001 Linden et al.
6,513,015 B2 1/2003 Ogasawara
6,694,300 B1 2/2004 Walker et al.
7,783,549 B1 8/2010 Benson et al.
7,818,399 B1 10/2010 Ross, Jr. et al.
(Continued)

FOREIGN PATENT DOCUMENTS

WO 01/37183 A1 5/2001

OTHER PUBLICATIONS

Final Office Action dated Apr. 10, 2019, for U.S. Appl. No. 15/365,902, of Zigoris, P., et al., filed Nov. 30, 2016.
(Continued)

*Primary Examiner* — Scott A Zare
(74) *Attorney, Agent, or Firm* — Lee & Hayes, P.C.

(57) ABSTRACT

Techniques and arrangements for performing data analysis in order to generate connections between merchants. For instance, a payment service may determine, based at least in part on transaction information, that a first customer conducted a first transaction at a first merchant followed a subsequent transaction at a second merchant. The payment service may further determine that a second customer conducted a second transaction at the first merchant followed by a subsequent transaction at a third merchant, Based on transaction information associated with the first transaction and the second transaction, the payment service may create a buyer profile including the first customer and second customer. Upon the payment service receiving a request to process a third transaction between the first merchant and the second customer, the payment service can generate a recommendation that the second customer conduct a subsequent transaction to the third transaction at the second merchant rather than the third merchant. The payment service can then send a electronic communication that includes the recommendation to the first merchant or the second customer.

20 Claims, 8 Drawing Sheets

(56) References Cited

U.S. PATENT DOCUMENTS

| | | | |
|---|---|---|---|
| 7,962,361 B2 | 6/2011 | Ramchandani et al. | |
| 8,145,531 B1 | 3/2012 | Ptak et al. | |
| 8,175,908 B1 | 5/2012 | Anderson | |
| 8,667,074 B1 | 3/2014 | Farkas | |
| 9,619,831 B1* | 4/2017 | Kumar | G06Q 30/0631 |
| 9,767,471 B1 | 9/2017 | Perrone et al. | |
| 9,916,562 B1 | 3/2018 | Armato | |
| 10,290,016 B1 | 5/2019 | Rose | |
| 2002/0010617 A1 | 1/2002 | Harnaguchi et al. | |
| 2002/0082920 A1 | 6/2002 | Austin et al. | |
| 2002/0087384 A1 | 7/2002 | Neifeld | |
| 2003/0009705 A1 | 1/2003 | Thelander et al. | |
| 2003/0212601 A1 | 11/2003 | Silva et al. | |
| 2005/0038893 A1 | 2/2005 | Graham | |
| 2005/0246740 A1 | 11/2005 | Teraci et al. | |
| 2005/0256782 A1 | 11/2005 | Sands et al. | |
| 2006/0133317 A1 | 6/2006 | Hurtta | |
| 2006/0253321 A1 | 11/2006 | Heywood | |
| 2007/0179836 A1 | 8/2007 | Juang et al. | |
| 2008/0103888 A1 | 5/2008 | Weir | |
| 2008/0249837 A1 | 10/2008 | Angell et al. | |
| 2009/0006188 A1 | 1/2009 | Guo et al. | |
| 2009/0076898 A1 | 3/2009 | Wang et al. | |
| 2009/0094237 A1 | 4/2009 | Churi et al. | |
| 2009/0150193 A1 | 6/2009 | Hong et al. | |
| 2009/0157472 A1 | 6/2009 | Burazin et al. | |
| 2009/0271275 A1* | 10/2009 | Regmi | G06Q 20/209 705/14.73 |
| 2010/0222036 A1 | 9/2010 | Wormald et al. | |
| 2010/0228593 A1 | 9/2010 | Belwadi et al. | |
| 2010/0274566 A1 | 10/2010 | Carlson | |
| 2010/0274680 A1 | 10/2010 | Carlson et al. | |
| 2010/0280880 A1* | 11/2010 | Faith | G06Q 10/06375 705/7.37 |
| 2011/0022463 A1* | 1/2011 | Harris | G06Q 20/04 705/14.51 |
| 2011/0035278 A1 | 2/2011 | Fordyce, III et al. | |
| 2011/0035288 A1 | 2/2011 | Clyne | |
| 2011/0082729 A1 | 4/2011 | Carvallo et al. | |
| 2011/0106607 A1 | 5/2011 | Alfonso et al. | |
| 2011/0119132 A1 | 5/2011 | Morton et al. | |
| 2011/0125566 A1 | 5/2011 | McLaughlin et al. | |
| 2011/0145628 A1 | 6/2011 | Wilson et al. | |
| 2011/0191142 A1 | 8/2011 | Huang et al. | |
| 2011/0231257 A1 | 9/2011 | Winters | |
| 2011/0231305 A1 | 9/2011 | Winters | |
| 2011/0231819 A1 | 9/2011 | Tanner et al. | |
| 2011/0238474 A1 | 9/2011 | Carr et al. | |
| 2011/0251888 A1 | 10/2011 | Faith et al. | |
| 2011/0264501 A1 | 10/2011 | Clyne | |
| 2011/0264581 A1 | 10/2011 | Clyne | |
| 2011/0302016 A1 | 12/2011 | Haddad | |
| 2012/0059911 A1 | 3/2012 | Randhawa et al. | |
| 2012/0143700 A1 | 6/2012 | Bhattacharya et al. | |
| 2012/0173427 A1 | 7/2012 | Sparks | |
| 2012/0239504 A1 | 9/2012 | Curlander et al. | |
| 2012/0271691 A1 | 10/2012 | Hammad et al. | |
| 2012/0271715 A1 | 10/2012 | Morton et al. | |
| 2012/0278139 A1 | 11/2012 | Mercuri et al. | |
| 2012/0290349 A1 | 11/2012 | Burkhart et al. | |
| 2013/0030915 A1 | 1/2013 | Statler et al. | |
| 2013/0031006 A1 | 1/2013 | McCullagh et al. | |
| 2013/0046626 A1 | 2/2013 | Grigg et al. | |
| 2013/0046717 A1 | 2/2013 | Grigg et al. | |
| 2013/0132140 A1 | 5/2013 | Amin et al. | |
| 2013/0132246 A1 | 5/2013 | Amin et al. | |
| 2013/0132283 A1 | 5/2013 | Hayhow et al. | |
| 2013/0132887 A1 | 5/2013 | Amin et al. | |
| 2013/0159110 A1 | 6/2013 | Rajaram et al. | |
| 2013/0246120 A1 | 9/2013 | Chang et al. | |
| 2013/0246207 A1 | 9/2013 | Novak et al. | |
| 2013/0246301 A1 | 9/2013 | Radhakrishnan et al. | |
| 2013/0254008 A1 | 9/2013 | Ovick et al. | |
| 2013/0262226 A1 | 10/2013 | LaChapelle et al. | |
| 2013/0262295 A1 | 10/2013 | Narayanan | |
| 2013/0262307 A1 | 10/2013 | Fasoli et al. | |
| 2013/0275266 A1 | 10/2013 | Goff et al. | |
| 2013/0346170 A1 | 12/2013 | Epstein et al. | |
| 2014/0047101 A1* | 2/2014 | Nix | G06Q 30/0631 709/224 |
| 2014/0089133 A1 | 3/2014 | Argue et al. | |
| 2014/0108256 A1 | 4/2014 | Bircher-Nagy et al. | |
| 2014/0129135 A1 | 5/2014 | Holden et al. | |
| 2014/0129302 A1 | 5/2014 | Amin et al. | |
| 2014/0129951 A1 | 5/2014 | Amin et al. | |
| 2014/0156449 A1 | 6/2014 | Ganesan et al. | |
| 2014/0214562 A1 | 7/2014 | Cancro et al. | |
| 2014/0214572 A1 | 7/2014 | Cancro et al. | |
| 2014/0229323 A1* | 8/2014 | Or | G06O 30/0631 705/26.7 |
| 2014/0236669 A1 | 8/2014 | Milton et al. | |
| 2014/0240725 A1 | 8/2014 | Banfield et al. | |
| 2014/0278609 A1 | 9/2014 | Capps | |
| 2014/0279015 A1 | 9/2014 | Root et al. | |
| 2014/0344093 A1 | 11/2014 | Du et al. | |
| 2014/0365301 A1 | 12/2014 | Rappoport et al. | |
| 2015/0051994 A1 | 2/2015 | Ward et al. | |
| 2015/0095228 A1 | 4/2015 | Su et al. | |
| 2015/0120433 A1 | 4/2015 | Chaouki et al. | |
| 2015/0142551 A1 | 5/2015 | Papakipos et al. | |
| 2015/0170300 A1 | 6/2015 | Wilson et al. | |
| 2015/0187021 A1 | 7/2015 | Moring et al. | |
| 2015/0206087 A1 | 7/2015 | Tavares | |
| 2015/0248694 A1 | 9/2015 | Chandra | |
| 2015/0262221 A1 | 9/2015 | Nakano et al. | |
| 2015/0269642 A1 | 9/2015 | Cai et al. | |
| 2015/0287077 A1* | 10/2015 | Celikyilmaz | G06Q 30/0253 705/14.51 |
| 2016/0042387 A1 | 2/2016 | Blackhurst et al. | |
| 2016/0086217 A1* | 3/2016 | Loomis | G06F 16/22 705/14.51 |
| 2016/0086257 A1 | 3/2016 | Collins et al. | |
| 2016/0180393 A1 | 6/2016 | Mulye | |
| 2016/0255040 A1 | 9/2016 | Howe | |
| 2016/0255044 A1 | 9/2016 | Howe | |
| 2017/0098286 A1* | 4/2017 | Gould | G06F 16/24 |
| 2017/0103392 A1 | 4/2017 | Morre et al. | |
| 2017/0169497 A1* | 6/2017 | Lee | G06Q 30/0631 |
| 2017/0228808 A1 | 8/2017 | Kumar et al. | |
| 2017/0372345 A1* | 12/2017 | Shastry | G06Q 30/0239 |
| 2019/0228431 A1 | 7/2019 | Rose | |
| 2019/0228455 A1 | 7/2019 | Kumar | |

OTHER PUBLICATIONS

Non-Final Office Action dated May 16, 2019, for U.S. Appl. No. 14/546,541, of Wikman, C.S., et al., filed Nov. 18, 2014.

Non-Final Office Action dated May 30, 2019, for U.S. Appl. No. 14/289,443, of Kumar, A., et al., filed May 28, 2014.

Final Office Action dated Jun. 3, 2019, for U.S. Appl. No. 14/691,151, of Hartard, B., et al., filed Apr. 20, 2015.

Advisory Action dated Aug. 24, 2018, for U.S. Appl. No. 13/682,488, of Dorogusker, J., filed Nov. 20, 2012.

Final Office Action dated Oct. 18, 2018, for U.S. Appl. No. 14/546,541, of Wikman, C.S., et al., filed Nov. 18, 2014.

"Uber-Android Apps on Google Play," dated Nov. 10, 2014, Retrieved from the Internet URL: https://play.google.com/store/apps/details?id=com.ubercab&hl=en, on Nov. 12, 2014, pp. 1-2.

Final Office Action dated Nov. 14, 2018, for U.S. Appl. No. 14/289,443, of Kumar, A., et al., filed May 28, 2014.

Non-Final Office Action dated Nov. 27, 2018, for U.S. Appl. No. 15/365,902, of Zigoris, P., et al., filed Nov. 30, 2016.

Non-Final Office Action dated Dec. 12, 2018, for U.S. Appl. No. 14/691,151, of Hartard, B., et al., filed Apr. 20, 2015.

Notice of Allowance dated Dec. 28, 2018, for U.S. Appl. No. 14/230,286, of Rose, C., filed Mar. 31, 2014.

Notice of Allowance dated Jan. 7, 2019, for U.S. Appl. No. 15/445,619, of Kumar, A., et al., filed Feb. 28, 2017.

Advisory Action dated Feb. 14, 2019, for U.S. Appl. No. 14/289,443, of Kumar, A., et al., filed May 28, 2014.

(56) References Cited

OTHER PUBLICATIONS

Non-Final Office Action dated Feb. 21, 2014, for U.S. Appl. No. 13/682,488, of Dorogusker, J., filed Nov. 20, 2012.
Non-Final Office Action dated Jul. 16, 2014, for U.S. Appl. No. 13/682,488, of Dorogusker, J., filed Nov. 20, 2012.
Final Office Action dated Dec. 5, 2014, for U.S. Appl. No. 13/682,488, of Dorogusker, J., filed Nov. 20, 2012.
Non-Final Office Action dated Jul. 15, 2015, for U.S. Appl. No. 13/682,488, of Dorogusker, J., filed Nov. 20, 2012.
Non-Final Office Action dated Dec. 14, 2015, for U.S. Appl. No. 14/230,286, of Rose, C., filed Mar. 31, 2014.
Final Office Action dated Jan. 8, 2016, for U.S. Appl. No. 13/682,488, of Dorogusker, J., filed Nov. 20, 2012.
Final Office Action dated Jul. 21, 2016, for U.S. Appl. No. 14/230,286, of Rose, C., filed Mar. 31, 2014.
Non-Final Office Action dated Jul. 28, 2016, for U.S. Appl. No. 14/289,469, of Kumar, A., et al., filed May 28, 2014.
Non-Final Office Action dated Jul. 29, 2016, for U.S. Appl. No. 14/284,980, of Perrone, G., et al., filed May 22, 2014.
Non-Final Office Action dated Sep. 9, 2016, for U.S. Appl. No. 13/682,488, of Dorogusker, J., filed Nov. 20, 2012.
Non-Final Office Action dated Dec. 19, 2016, for U.S. Appl. No. 14/289,443, of Kumar, A., et al., filed May 28, 2014.
Final Office Action dated Dec. 21, 2016, for U.S. Appl. No. 14/284,980, of Perrone, G., et al., filed May 22, 2014.
Notice of Allowance dtaed Dec. 23, 2016, for U.S. Appl. No. 14/289,469, of Kumar, A., et al., filed May 28, 2014.
Final Office Action dated Dec. 28, 2016, for U.S. Appl. No. 13/682,488, of Dorogusker, J., filed Nov. 20, 2012.
Advisory Action dated Feb. 22, 2017, for U.S. Appl. No. 14/284,980, of Perrone, G., et al., filed May 22, 2014.
Non-Final Office Action dated Apr. 3, 2017, for U.S. Appl. No. 14/230,286, of Rose, C., filed Mar. 31, 2014.
Advisory Action dated Apr. 13, 2017, for U.S. Appl. No. 13/682,488, of Dorogusker, J., filed Nov. 20, 2012.
Advisory Action dated May 1, 2017, for U.S. Appl. No. 13/682,488, of Dorogusker, J., filed Nov. 20, 2012.
Notice of Allowance dated May 22, 2017, for U.S. Appl. No. 14/284,980, of Perrone, G., et al., filed May 22, 2014.
Non-Final Office Action dated Jun. 27, 2017, for U.S. Appl. No. 14/691,151, of Hartard, B., et al., filed Apr. 20, 2015.
Non-Final Office Action dated Jul. 27, 2017, for U.S. Appl. No. 14/546,541, of Wikman, C.S., et al., filed Nov. 18, 2014.
Final Office Action dated Sep. 22, 2017, for U.S. Appl. No. 14/230,286, of Rose, C., filed Mar. 31, 2014.
Final Rejection dated Dec. 6, 2017, for U.S. Appl. No. 14/289,443, of Kumar, A., et al., filed May 28, 2014.
Final Office Action dated Jan. 17, 2018, for U.S. Appl. No. 14/691,151, of Hartard, B., et al., filed Apr. 20, 2015.
Non-Final Office Action dated Feb. 1, 2018, for U.S. Appl. No. 13/682,488, of Dorogusker, J., filed Nov. 20, 2012.
Advisory Action dated Feb. 28, 2018, for U.S. Appl. No. 14/230,286, of Rose, C., filed Mar. 31, 2014.
Advisory Action dated Mar. 22, 2018, for U.S. Appl. No. 14/691,151, of Hartard, B., et al., filed Apr. 20, 2015.
Non-Final Office Action dated Apr. 4, 2018, for U.S. Appl. No. 14/289,443, of Kumar, A., et al., filed May 28, 2014.
Non-Final Office Action dated Jun. 8, 2018, for U.S. Appl. No. 14/230,286, of Rose, C., filed Mar. 31, 2014.
Final Office Action dated Jun. 13, 2018, for U.S. Appl. No. 13/682,488, of Dorogusker, J., filed Nov. 20, 2012.
Non-Final Office Action dated Apr. 29, 2019, for U.S. Appl. No. 16/370,813, of Rose, C. filed Mar. 29, 2019.
Advisory Action dated Aug. 1, 2019, for U.S. Appl. No. 15/365,902, of Zigoris, P., et al., filed Nov. 30, 2016.
Advisory Action dated Aug. 9, 2019, for U.S. Appl. No. 14/691,151, of Hartard, B., et al., filed Apr. 20, 2015.

\* cited by examiner

USING DATA ANALYSIS TO CONNECT MERCHANTS

BACKGROUND

Merchants may conduct transactions for items and services with customers. To conduct a transaction with a customer, a merchant can use a point-of-sale (POS) device to receive payment from the customer, such as in the form of a payment instrument, and process the payment instrument for a cost of the transaction using a payment system. The merchant can then use the POS device to generate a receipt for the customer. The receipt can include a digital receipt that the POS device sends the customer via contact information of the customer, such as an email address of the customer. The customer can provide the merchant with the contact information at a time of the transaction.

After processing the transaction with the merchant, the payment service may later receive another request to authorize the payment instrument for a transaction between an additional merchant and the customer. For instance, the customer may have a routine in which the customer conducts a transaction with the merchant followed by conducting a subsequent transaction with the additional merchant. This routine performed by the customer may be based on products and/or services that are provided by each of the two merchants.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
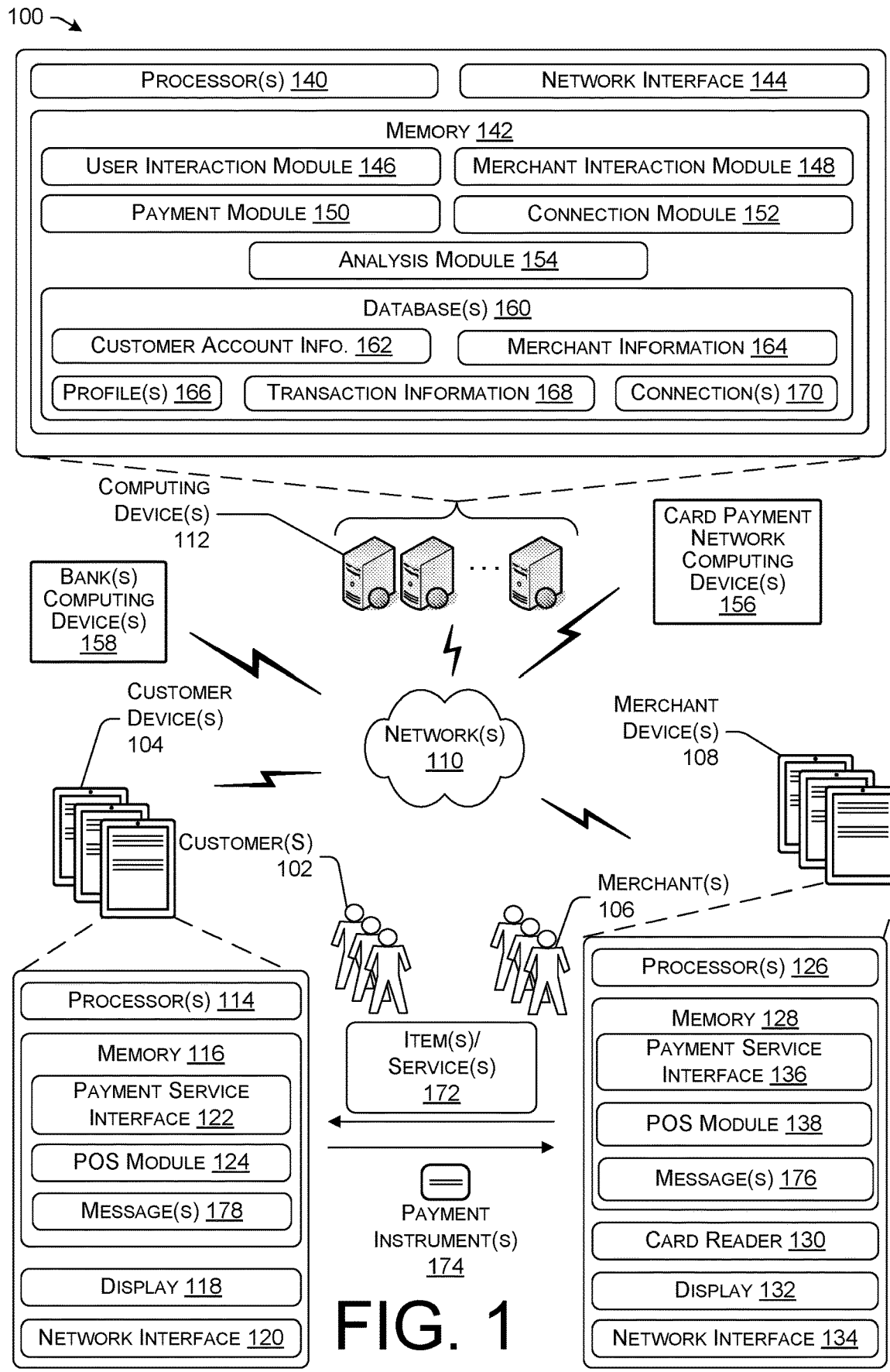
FIG. 1 illustrates an example system that utilizes data analysis to generate connections between merchants.

This disclosure describes systems and processes for performing data analysis in order to generate connections between merchants. For instance, merchants can conduct transactions with customers using respective point-of-sale (POS) devices. During a respective transaction between a merchant and a customer, a POS device can receive payment information associated with a payment instrument of the customer. For instance, the POS device can include a card reader that reads the payment information from the payment instrument. The POS device can then send a request to a payment service to authorize the payment instrument for a cost of the transaction, where the request includes the payment information. In response, the POS device can receive, from the payment service, a message indicating whether the payment instrument was authorized for the cost of the transaction.

In some instances, customers may conduct subsequent transactions with respective merchants over given time periods. For instance, a customer may conduct a first transaction with a first merchant and subsequent to the first transaction, conduct a second transaction with a second merchant. In some instances, the customers may conduct the subsequent transactions with the respective merchants based on respective types of businesses that are associated with each of the merchants (e.g., categories of items/services provided by each of the merchants). For example, a customer may conduct a first transaction at a first merchant that provides coffee at 6:00 a.m. in the morning followed by conducting a second transaction at a second merchant that provides a breakfast bagel at 6:15 a.m. For another example, a customer may conduct a first transaction at a first merchant in which the customer purchases golf clubs. Later that same week, the customer may conduct a second transaction at a second merchant in which the customer purchases a round of golf.

In either of the examples, the customer conducts subsequent transactions with the respective merchants based on the category of items/services provided by each of the merchants. For instance, in the first example, the customer purchases a first item, coffee, which is associated with breakfast. Later in the morning, the customer then purchases a second item, a bagel, which is also associated with breakfast. Since the coffee and the bagel are each associated with breakfast, the coffee and bagel may be associated with a specific category of items/services (e.g., breakfast items). Additionally, for the second example, the customer purchases a first item, golf clubs, which are associated with golfing. The customer then purchases a first service, a round of golf, which is also associated with golfing. Since the golf clubs and the round of golf are each associated with golfing, the golf clubs and the round of golf are associated with a specific category of items/services (e.g., golfing items/services).

As described herein, a subsequent transaction to a first transaction can include any transaction that the customer conducts with a merchant after conducting the first transaction with a first merchant. For example, a subsequent transaction can include the next transaction that the customer conducts with a merchant after conducting the first transaction with the first merchant. For instance, the customer can conduct the first transaction with the first merchant and after conducting the first transaction, conduct the subsequent transaction with the second merchant. For another example, a subsequent transaction can include the second (and/or third, fourth, fifth, etc.) transaction that the customer conducts with another merchant after conducting the first transaction with the first merchant. For instance, the customer can conduct the first transaction with the first merchant, followed by conducting a second transaction with a second merchant, and finally followed by conducting the subsequent transaction with a third merchant.

In some instances, a payment service can perform data analysis in order to generate connections between merchants based on transaction information, and then send recommendations to the merchants and/or customers based on the connections. For instance, the payment service can receive transaction information from POS devices associated with respective merchants. The transaction information can include both buyer information and item information that describes transactions between the merchants and customers. For instance, the transaction information for a respective transaction can indicate an identifier of the merchant, an identifier (e.g., name) of the customer, payment information associated with a payment instrument used by the customer during the respective transaction, item(s)/service(s) acquired by the customer during the respective transaction, a cost of the item(s)/service(s) acquired by the customer during the respective transaction, a time, place and date of the respective transaction, and so forth.

In some instances, the payment service can associate the transaction information with one or more profiles. For example, the payment service can associate transaction information describing transactions that occur at a specific merchant with a profile associated with the merchant (e.g., a buyer profile). For another example, the payment service can associate transaction information describing transactions performed by a specific customer with a profile associated with the customer. Additionally, for another example, the payment service can associate transaction information describing transactions in which customers acquired a specific category of items (e.g., breakfast item, sporting equipment, etc.) and/or specific category of services (e.g., cleaning service, taxi service, etc.) with a profile that is associated with the specific category of items/services. Furthermore, for another example, the payment service can associate transaction information describing transactions that occur at a specific type of merchant (e.g., restaurant, sporting goods retailer, or other type of business) with a profile associated with the specific type of merchant.

The payment service can analyze the transaction information and/or the one or more profiles using one or more algorithms to identify relationships between merchants. For example, the payment service can identify merchants that have each conducted a respective transaction with a customer. For another example, the payment service can identify merchants that have each conducted respective transactions with multiple customers. In some instances, the one or more algorithms identify the relationships by searching through the transaction information to identify similarities between transactions. For instance, the one or more algorithms can identify transactions that include a similar merchant, a similar customer, similar payment information associated with a payment instrument used by the customer, similar item(s)/service(s) acquired by the customer, a similar cost of the item(s)/service(s) acquired by the customer, a similar time, place and date, and so forth.

The payment service can then utilize the relationships in order to generate connections between the merchants. In some instances, the connections can include general connections and interrelated connections. A general connection can include a connection between merchants that the payment service generates based on at least one customer conducting respective transactions at each of the merchants. For example, the payment service may generate a general connection between a first merchant and a second merchant based on at least one customer conducting respective transactions at the first merchant and the second merchant. An interrelated connection can include a connection between merchants that the payment service generates based on both at least one customer conducting respective transactions at each of the merchants, and an order in which the at least one customer conducts the respective transactions. For example, the payment service may generate an interrelated connection between a first merchant and a second merchant based on at least one customer conducting a first transaction at the first merchant and, after conducting the first transaction, conducting a second transaction (e.g., subsequent transaction) at the second merchant.

In some instances, when generating an interrelated connection between merchants, the payment service may set a threshold number of transactions (e.g., zero, one, two, three, etc.) that can occur between the first transaction and the subsequent transaction. For example, the payment service may generate an interrelated connection between a first merchant and a second merchant when at least one customer conducts five or less transactions with other merchants between conducting a first transaction with the first merchant and a subsequent transaction with the second merchant. For another example, the payment service may generate an interrelated connection between a first merchant and a second merchant when at least one customer conducts ten or less transactions with other merchants between conducting a first transaction with the first merchant and a subsequent transaction with the second merchant.

Additionally or alternatively, in some instances, when generating an interrelated connection between merchants, the payment service may specify a threshold period of time (e.g., minute, hour, day, week, year, etc.) that can pass between the first transaction and the subsequent transaction. For example, the payment service may generate an interrelated connection between a first merchant and a second merchant when at least one customer conducts a subsequent transaction with the second merchant within one hour of conducting a first transaction with the first merchant. For another example, the payment service may generate an interrelated connection between a first merchant and a second merchant when at least one customer conducts a subsequent transaction with the second merchant within one month of conducting a first transaction with the first merchant.

Additionally or alternatively, in some instances, the payment service may use other factors when generating interrelated connections between merchants. For example, the payment service may utilize a threshold distance (e.g., block, mile, ten miles, etc.) between merchants when generating interrelated connections between merchants. For instance, the payment service may only generate an interrelated connection between merchants when a distance between the merchants is no further than one mile. For another example, the payment service may utilize a respective type of business associated with each of the merchants when generating interrelated connections between merchants. For instance, the payment service may only generate an interrelated connection between merchants when the merchants each provide a similar category of item(s)/service(s) and/or when the merchants provide related item(s)/service(s).

For instance, merchants can each provide a similar category of item(s) when each of the merchants provides sporting goods, groceries, electronics, or the like. Merchants can each provide a similar category of service(s) when each of the merchants provide golfing lessons, maid services, catering services, or the like. Additionally, merchants can provide related item(s)/service(s) when the merchants provide item(s)/service(s) that customers acquire during subsequent transactions. For instance, and using the examples above, the first merchant that sells coffee provides related item(s)/service(s) as the second merchant that provides bagels, as customers may purchase bagels subsequently to purchasing coffee. Additionally, the first merchant that sells golf clubs provides related item(s)/service(s) as the second merchant that provides a round of golf, as customers may purchase a round of golf subsequently to purchasing golf clubs.

In some instances, the payment service may generate the connections using one or more threshold values. For example, the payment service may generate a general connection between a first merchant and a second merchant based on a threshold number of customers each conducting respective transactions at the first merchant and the second merchant. For another example, the payment service may generate an interrelated connection between a first merchant and a second merchant based on a threshold number of customers each conducting a first transaction at the first merchant followed by conducting a subsequent transaction at the second merchant. In some instance, when using the threshold value, the payment service first calculates a value associated with a number of customers that have conducted transactions that satisfy the connection. The payment service then compares the value to the threshold value in order to determine whether the threshold is satisfied (e.g., exceeded by the value).

Using the connections, the payment service can then send recommendations to merchants and/or customers. For instance, the payment service may receive an indication that a customer is conducting a transaction with a first merchant. In some instances, receiving the indication can include receiving, from a POS device of the first merchant, a request to authorize a payment instrument of the customer for a cost of the first transaction between the first merchant and the customer. Based on receiving the indications, the payment service can identify at least one connection between the first merchant and at least one merchant. For instance, the payment service can identify one or more general connections and/or one or more interrelated connections between the first merchant and one or more other merchants. The payment service can then use the one or more connections to determine which merchant(s) to recommend to the customer for conducting one or more subsequent transactions.

In some instances, to determine which merchant(s) to recommend to the customer, the payment service may use information associated with the customer. The information can include a geographic location associated with the customer (e.g., an address), a geographic location associated with a customer device of the customer (e.g., Global Positioning System (GPS) location), transaction information associated the customer, a gender of the customer, an age of the customer, an income level for the customer, or the like. In some instances, the payment service can store the information in association with an identity of the customer. For instance, the payment service can store the information in association with a profile of the customer. In some instances, the payment service may receive the information along with the indication that the customer is conducting the first transaction with the first merchant.

In some instances, the payment service can then use the information to recommend merchant(s) to the customer that change the behavior of the customer. For example, to determine a merchant using the information, the payment service can determine that the customer usually conducts transactions at the first merchant followed by conducting subsequent transactions at a second merchant. Based on the determination, the payment service can send the customer a message recommending that the customer conduct a subsequent transaction with at least one merchant other than the second merchant. For instance, the payment service can identify a connection that indicates that a threshold number of customers each conduct a first transaction at the first merchant and after conducting the first transaction, conduct a subsequent transaction at a third merchant. The payment service can thus determine to send the customer a message recommending that the customer conduct a subsequent transaction at the third merchant.

For a second example, the payment service can determine that a connection indicates that at least one other customer routinely conducts a first transaction at the first merchant and, after conducting the first transaction, conducts a subsequent transaction at a second merchant. The payment service can further analyze the transaction information associated with the customer to determine that the transaction information does not indicate that the customer has conducted a transaction with the second merchant. Based on the connection between the first merchant and the second merchant, and based on determining that the transaction information does not indicate that the customer has conducted a transaction with the second merchant, the payment service can determine to send the customer a message recommending that the customer conduct a subsequent transaction at the second merchant.

Additionally, for a third example, based on the transaction information, the payment service can determine that the customer usually conducts transactions at the first merchant followed by conducting subsequent transactions at a second merchant, where the second merchant is associated with a specific type of business. The payment service can then identify a connection that indicates that at least one other customer conducts transactions at the first merchant followed by conducting transactions at a third merchant, where the third merchant is also associated with the specific type of business. Based on the connection between the first merchant and the third merchant, and based on the second merchant and the third merchant being associated with the specific type of business, the payment service can determine to send the customer a message recommending that the customer conduct a subsequent transaction at the third merchant.

In addition to using the information associated with the customer to recommend merchant(s), the payment service can use information associated each of the one or more other merchants to determine which merchant(s) to recommend to the customer. For example, the payment service can recommend a merchant that includes the highest customer rating among the one or more merchants. For another example, the payment service can recommend merchant(s) that provide similar category of item(s)/service(s) and/or related item(s)/service(s) as the first merchant. Still, for another example, the analysis module can recommend merchant(s) that are within a threshold distance (e.g., a bock, a mile, ten miles, etc.) of a location associated with the first merchant and/or a location associated with the customer (e.g., the geographical location of the customer device).

In some instances, the payment service can further communicate with the one or more other merchants to determine which merchant(s) to recommend to the customer. For instance, the payment service can send messages to each of the one or more other merchants that indicate that the payment service is going to recommend merchant(s) to the customer. In response, the payment service can receive one or more messages from the merchants, where each message requests that the payment service recommend a respective merchant. The payment service can then determine to recommend the merchant(s) based on the one or more messages For example, the payment service can determine which merchant(s) to recommend based on an order in which the payment service receives the one or more messages from the one or more merchants. For instance, the payment service can recommend the merchant that sends the first message to the payment service. For another example, the payment service can determine which merchant to recommend based on bids from the responding merchants. For instance, when one or more of the merchants respond to the payment service, the payment service can recommend the merchant that bids the highest amount for the recommendation.

After determining at least one merchant to recommend for the subsequent transaction, the payment service can send the message that recommends the merchant. In some instances, sending the message can include sending the message to the POS device of the first merchant. The POS device can then receive the message from the payment service and, in response, provide the message to the customer. In some instances, providing the message can include displaying the message to the customer using a display device. In some instances, providing the message can include adding the message to a receipt that is provided to the customer. For instance, the POS device may print the message on a physical receipt, and/or the POS device may add the message to a digital receipt.

In some instances, sending the message can include sending the message from the payment service to the customer. For instance, the payment service can use contact information associated with the customer, such as an email address, telephone number, home address, fax number, or the like, to send the message to the customer. For example, if the contact information includes an email address, the payment service can generate an email that recommends that the customer conduct a subsequent transaction at a given merchant. The payment service can then send the email to the customer using the email address. For another example, if the contact information includes a telephone number, the payment service can generate a text message that recommends that the customer conduct a subsequent transaction at a given merchant. The payment service can then send the text message to the customer using the telephone number.

Still, in some instances, sending the message can include sending the message to a customer device via an application executing on the customer device. For instance, the customer device may execute an application that provides the customer with POS functionality. For instance, the application can provide the customer a list of merchants, where each of the merchants includes a respective account with the payment service. The customer can then use the application to conduct transactions with respective merchants. Additionally, the payment service can send the message that recommends that the customer conduct a subsequent transaction with a merchant via the application. For instance, the payment service can send the customer device a push notification that recommends the merchant via the application.

In some instances, the payment service can send the message to the customer at one or more determined times. A determined time an include specific time, such as 3:00 a.m. on Monday, or a determined time can include a time interval, such on Monday between 3:00 a.m. and 5:00 a.m. In some instances, to determine the one or more times, the payment service can use the connections between the merchants. For instance, the payment service can analyze transaction information that indicates a connection between the first merchant and a second merchant to determine a time interval (e.g., an average time interval) between when at least one customer conducts a first transaction at the first merchant and a subsequent transaction at the second merchant. The payment service can then use the time interval to determine the one or more times for sending the message.

For example, the time interval can indicate that the at least one customer conducts the subsequent transaction with the second merchant within one hour after conducting the first transaction with the first merchant. Based on the time interval, the payment service can determine to send the customer one or more messages within one hour of the customer conducting the first transaction at the first merchant. For another example, the time interval can indicate that the at least one customer conducts the subsequent transaction with the second merchant within one month after conducting the first transaction with the first merchant. Based on the time interval, the payment service can determine to send the customer one or more messages within one month of the customer conducting the first transaction with the first merchant.

In some instances, in addition to, or alternatively from, sending the customer messages that recommend merchants, the payment service can further send messages that recommend items for the customer. For instance, the payment service can analyze the transaction information to identify connections between items and/or services that the customer orders from one or more merchants. The payment service can then use the connections to send a message to a merchant and/or the customer that recommends that the customer order a specific item/service.

For example, the payment service can analyze the transaction information to determine that, during transactions with a first merchant, the customer orders a first item and a second from the first merchant. Based on the determination, the payment service can identify a connection between the first item and the second item. The payment service can then receive an indication that the customer is ordering the first item from a second merchant during a second transaction. For instance, the payment service can receive a request, from a POS device of the second merchant, to authorize a payment instrument of the customer for a cost of the first item. Based on the connection, the payment service can send the POS device of the second merchant and/or the customer a message that recommends that the customer order the second item from the second merchant. In some instance, the payment service first determines that the second merchant provides the second item before sending the message.

It should be noted that the techniques and examples above describe transactions that occur at merchant locations of the respective merchants. However, in some instances, the transactions may include online transactions in which customers are acquiring item(s) and/or service(s) from merchants via online marketplaces associated with the respective merchants. For instance, and using the example above, the customer may be using an online marketplace of a merchant to purchase the first item during a transaction. While authorizing a payment instrument of the customer for a cost of the first item, the payment service may send the customer a message that recommends the second item based on the connection between the first item and the second item.

It should further be noted that the techniques and examples above describe types of businesses associated with respective merchants and/or categories of item(s)/service(s) provided by respective merchants. In some instances, the payment service may utilize Merchant Category Codes (MCCs) (and/or some other type of code) associated with the respective merchants to determine the types of businesses associated with respective merchants and/or categories of item(s)/service(s) provided by respective merchants. The payment service can then use the MCCs to determine whether merchants are associated with a similar type of business, and/or the payment service can use the MCCs to determine whether merchants provide similar and/or related categories of item(s)/service(s). For example, the payment service may determine that two merchants are each associated with a similar type of business based on each of the merchants being associated with a similar MCC.

Finally, it should be noted that the techniques and examples above describe the payment service analyzing the data. However, in some instances, the payment service, one or more merchant devices, one or more customer devices, one or more other electronic devices, and/or any combination thereof may analyze the data in order to generate connections. Additionally, the payment service, one or more merchant devices, one or more customer devices, one or more other electronic devices, and/or any combination thereof may utilize the connections to send/receive messages with merchants and customers.

By analyzing data to create connections between merchants, the techniques described above can create an improved system in which a payment service, merchants, and customers are linked together based at least in part on transactions that occur between the merchants and the customers. The payment service, the merchants, and/or the customers can then use the system to send/receive communications (e.g., messages) between one another. In some instances, such messages will be more relevant for the payment service, the merchants, and/or the customers, as they are sent/received based on the connections.

Additionally, the improved system provides improved techniques and/or processes for synchronizing data from various sources (e.g., the merchants, customers, etc.). For instance, by analyzing the data to create connections, the payment service is synchronizing the transaction data received from numerous merchant devices and/or the customer devices. In some instances, the payment service synchronizes the transactions data using the various profiles (e.g., buyer profiles) that associate both customers and/or items/services with merchants and other respect customers. The payment service is then able to utilize the synchronized data (e.g., the profiles) to communicate timely recommendations to both merchants and customers.

Moreover, in some instances, the improved system is able to synchronize the data based on processing transactions for merchants. For instance, the payment service can receive requests from merchants to authorize payment instruments for respective transactions. The payment service can then use information (e.g., payment information) associated with the respective payment instruments to associated the transactions (e.g., transactions information) with respective profiles. This creates improvements to conventional services that merely process transactions for merchants, by extending the technical capabilities of the services. For instances, the payment service described herein is capable of processing transactions, utilizing data associated with the transactions to synchronize data across merchant devices using profiles, and then utilize the profiles to the provide the timely electronic communications to both merchants and customers.

Furthermore, by utilizing a payment service that is remote from the merchant devices, and processes transactions for various merchants associated with the respective merchant devices, the payment service improves previous techniques for providing recommendations to customers. For instance, conventionally, merchants may store data locally, such as on respective merchant devices, that can indicate preferences (e.g., item preferences) of customers. The merchants can then use the local data to provide recommendations to the customers when the customers are at the physical establishment of the respective merchants.

However, the payment service described herein stores data describing preferences of customers across multiple merchants, such as preferences that indicate orders in which customers conduct transactions at respective merchants. the payment service is then able to utilize the data to provide merchants and/or customers with recommendations that conventional systems (i.e., the merchant devices) were not capable of providing. For instance, the recommendations provided by the payment service can include both merchants that the customer should conduct subsequent transactions with as well as a timing in which the recommendations should be provided to the customers.

As used herein, a transaction may include a financial transaction for the acquisition of goods and/or services (referred to herein as items) that is conducted between a customer (e.g., a buyer or other user) and a merchant, such as at a POS location. Further, a merchant may include any business or other entity engaged in the offering of goods or services for acquisition by buyers in exchange for compensation received from the buyers. Actions attributed to a merchant herein may include actions performed by employees or other agents of the merchant and, thus, no distinction is made herein between merchants and their employees unless specifically discussed. In addition, as used herein, a customer may include any entity that acquires goods or services from a merchant, such as by purchasing, renting, leasing, borrowing, licensing, or the like. Customers may be buyers or potential buyers of a particular merchant. Hereinafter, goods and/or services offered by merchants may be referred to as items. Thus, a merchant and a customer may interact with each other to conduct a transaction in which the customer acquires one or more items from a merchant, and in return, the customer provides payment to the merchant.

As described herein, messages can include any type of electronic communication that electronic devices can send and receive with other electronic devices. For instance, a message can include an email message, a short message service (SMS), multimedia messages (MMS), a voicemail message, an audio signal, or any other type of electronic communication that an electronic device can send to another electronic device. In some instances, an electronic device may use messages to send indications, notifications, alerts, and/or requests to another electronic device.

FIG. 1 illustrates an example system 100 that utilizes data analysis to generate connections between merchants. More particularly, FIG. 1 provides the functionality for analyzing transaction information associated with respective transactions between merchants and customers in order to generate connections between the merchants. The framework further provides the functionality associated with sending messages to merchants and/or customers based on the connections.

As shown in FIG. 1, the system 100 may include one or more customer(s) 102 (e.g. customers, buyers, etc.), one or more customer device(s) 104 associated with the customer(s) 102, one or more merchant(s) 106, one or more merchant device(s) 108 associated with the one or more merchant(s) 106, one or more network(s) 110, and one or more computing device(s) 112. In various implementations, the customer(s) 102 may operate the customer device(s) 104, which may include one or more processor(s) 114, memory 116, a display 118 and a network interface 120. The memory 116 may store a payment service interface 122 and a POS module 124. Similarly, the merchant(s) 106 may operate the merchant device(s) 108, which may include one or more processor(s) 126, memory 128, a card reader 130, a display 132 and a network interface 134. The memory 128 may store a payment service interface 136 and a POS module 138. The computing device(s) 112 may also include one or more processor(s) 140, memory 142 and a network interface 144. The memory 142 may store a user interaction module 146, a merchant interaction module 148, a payment module 150, a connection module 152, and an analysis module 154.

In some implementations, one of the customer(s) 102 may operate a customer device(s) 104 to perform various functions associated with the customer device(s) 104. For example, a customer 102 may utilize a customer device 104, and particularly the payment service interface 122 thereof, to interact with the computing device(s) 112 via the network interface 120 to establish a customer account with the payment service of the computing device(s) 112. In addition, the customer 102 may utilize POS module 124 of the customer device 104 to interface with the POS module 138 of the merchant device(s) 108, e.g. as part of a transaction using the payment service of the computing device(s) 112. For example, the customer device 104 may communicate via the network interface 120 with the merchant device(s) 108 and the network interface 134. As an example of such a payment operation, the POS module 138 of the merchant device(s) 108 may communicate with the POS module 124 of the customer device 104 to obtain information for processing a payment from the customer 102 to the merchant 106 using the payment service of the computing device(s) 112.

In some implementations, the customer device(s) 104 may be any type of device that is capable of interacting with the merchant device(s) 108 and/or the computing device(s) 112. For instance, the customer device(s) 104 may include a personal computer, a laptop computer, a cellular telephone, a PDA, a tablet device, or any other device. The customer device(s) 104 shown in FIG. 1 are only one example of customer device(s) 104 and are not intended to suggest any limitation as to the scope of use or functionality of any of the customer device(s) 104 utilized to perform the processes and/or procedures described herein. For example, the customer device(s) 104 may include various other applications or modules, such as a module for a customer dashboard to enable the customer(s) 102 to control information in a customers' respective profiles, set customer preferences, and so forth.

The processor(s) 114 of the customer device(s) 104 may execute one or more modules and/or processes to cause the customer device(s) 104 to perform a variety of functions, as set forth above and explained in further detail in the following disclosure. In some implementations, the processor(s) 114 may include a central processing unit (CPU), a graphics processing unit (GPU), both CPU and GPU, or other processing units or components known in the art. Additionally, each of the processor(s) 114 may possess its own local memory, which also may store program modules, program data, and/or one or more operating systems.

Depending on the exact configuration and type of the customer device(s) 104, the memory 116 may include volatile memory (such as RAM), non-volatile memory (such as ROM, flash memory, miniature hard drive, memory card, or the like), or some combination thereof.

In various implementations, the customer device(s) 104 may also have input device(s) such as a keyboard, a mouse, a pen, a voice input device, a touch input device, etc. The customer device(s) 104 may also include the display 118 and other output device(s), such as speakers, a printer, etc. The customer 102 may utilize the foregoing features to interact with the customer device(s) 104, merchant device(s) 108, or the computing device(s) 112 via the network(s) 110. More particularly, the display 118 of the customer device(s) 104 may include any type of display 118 known in the art that is configured to present (e.g., display) information to the customer(s) 102.

In various implementations, the one or more merchant(s) 106 may be any individual, entity, or machine that offers products, services or the like according to the examples herein. Moreover, each of the merchant(s) 106 may be associated with one or more merchant device(s) 108, which may be the same as, similar to, or different from the customer device(s) 104. The merchant device(s) 108 may include any number of components such as the one or more processor(s) 126, the memory 128, the card reader 130, the display 132 and/or network interface 134. The merchant(s) 106 may utilize the merchant device(s) 108 to interact with the customer device(s) 104 and/or computing device(s) 112 in any manner. For instance, the merchant device(s) 108 may be used to access an interface associated with the computing device(s) 112 (e.g. the payment service interface 136). Continuing the above example, a merchant device(s) 108 may utilize information obtained from interacting with the POS module 124 of the customer device(s) 104 to execute the payment from the customer(s) 102 to the merchants(s) 106 through the payment service of the computing device(s) 112. Further, the POS module 138 may control the operation of the card reader 130 to read payment information from credit cards, debit cards, gift cards and the like. Moreover, the POS module 138 may operate to interact with the card payment network computing devices(s) 156 and/or bank(s) computing device(s) 158 to execute payments from the customer(s) 102 to the merchant(s) 106.

While the customer device(s) 104 and merchant device(s) 108 are shown as including different modules, this is merely for ease of illustration and not intended as limiting. In various implementations, the customer device(s) 104 and merchant device(s) 108 may be identical, similar or distinct. Moreover, the modules shown and described for the customer device(s) 104 and merchant device(s) 108 may be implemented as more modules or as fewer modules and functions described for the modules may be redistributed depending on the details of the implementation. Further, in some implementations, the customer device(s) 104 and/or merchant device(s) 108 may vary from device to device. In general, the customer device(s) 104 and the merchant device(s) 108 can each be any appropriate device operable to send and receive requests, messages, or other types of information over the one or more network(s) 110 or directly to each other. Additionally, in some implementation, there may be thousands, hundreds of thousands, or more, of the customer device(s) 104 and the merchant device(s) 108.

In some implementations, the network(s) 110 may be any type of network known in the art, such as a local area network or a wide area network, such as the Internet, and may include a wireless network, such as a cellular network, a local wireless network, such as Wi-Fi and/or close-range wireless communications, such as Bluetooth® and Bluetooth® low energy, near field communications (NFC), a wired network, or any other such network, or any combination thereof. Accordingly, the one or more network(s) 110 may include both wired and/or wireless communication technologies, including Bluetooth®, Bluetooth® low energy, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail. Consequently, the customer device(s) 104, the merchant device(s) 108, and the computing device(s) 112 may communicatively couple to the network(s) 110 in any manner, such as by a wired or wireless connection. The network(s) 110 may also facilitate communication between the customer device(s) 104, the merchant device(s) 108, and the computing device(s) 112. In turn, the network interfaces 120, 134 and 144 of the customer device(s) 104, the merchant device(s) 108, and the computing device(s) 112 may be any network interface hardware components that may allow customer device(s) 104, the merchant device(s) 108, and the computing device(s) 112 communicate over the network(s) 110. For example, in a particular implementation, the network interfaces 120 and 134 of the customer device(s) 104 and merchant device(s) 108 may include near field communication capabilities for performing the communications there between involved in POS operations.

In addition, and as mentioned previously, the computing device(s) 112 may include the one or more processor(s) 140, the memory 142 and network interface 144. The computing device(s) 112 may also include additional components not listed above that may perform any function associated with the computing device(s) 112. In various implementations, the computing device(s) 112 may be any type of computing device, such as a network-accessible server, and may be one of multiple servers included in a server cluster or server farm. In other implementations, the processor(s) 140 and the memory 142 of the computing device(s) 112 may be the same as, similar to, or different from the processor(s) 114 and the memory 116, respectively, of the customer device(s) 104. As discussed above, the memory 142 may store the user interaction module 146, the merchant interaction module 148, the payment module 150, the connection module 152, the analysis module 154, and the database(s) 160. The database(s) 160 may store various information including customer account information 162, merchant information 164, profiles(s) 166, transaction information 168, and connection(s) 170.

The user interaction module 146 and merchant interaction module 148 operate to interface with the customer device(s) 104 and merchant device(s) 108, respectively. For example, the user interaction module 146 and merchant interaction module 148 may operate in accordance with instructions from the payment module 150 to request or provide information on behalf of the payment module 150. The payment module 150 may handle the processing of payments. For example, the payment module 150 may utilize the user interaction module 146 and the merchant interaction module 148 to handle communication with the customer(s) 102 and the merchant(s) 106, respectively. In addition, the payment module 150 may utilize information from the database(s) 160, such as the customer account information 162 and merchant information 164 to provide handling of payments between merchant(s) 106 and the customer(s) 102. In some implementations, customer account information 162 may include information regarding electronic payment accounts of the customer(s) 102.

As mentioned above, the payment module 150 may handle payments between the merchant(s) 106 and the customer(s) 102. When paying for a transaction, a customer can provide the amount of payment that is due to a merchant 106 using cash, check, a payment card, NFC, or by electronic payment through a payment service of the computing device(s) 112. The merchant 106 can interact with the merchant device(s) 108 to process the transaction. In some examples, the service of the computing devise 112 may handle some payments while other payments may at least at times be handled by point of sale (POS) transactions. In such cases, the point of sale may be the place where the customer 102 with customer device(s) 104 interacts with the merchant 106 with merchant device(s) 108 and executes a transaction (e.g. purchases items from a street vendor merchant or a restaurant merchant). During point-of-sale (POS) transactions, the merchant device(s) 108 can determine and send data describing the transactions (e.g., transaction information 168), including, for example, services provided, item(s) being purchased, the amount of the services or item(s), buyer information, and so forth.

In some implementations, the payment service enables card-less payments, i.e., electronic payments, for transactions between the customer(s) 102 and the merchant(s) 106 based interactions of the customer(s) 102 with the customer device(s) 104 and interactions of the merchant(s) 106 with the merchant device(s) 108. Accordingly, in some examples, a card-less payment transaction may include a transaction conducted between a customer 102 and a merchant 106 at a POS location during which an electronic payment account of the customer 102 is charged without the customer 102 having to physically present a payment card to the merchant 106 at the POS location. Consequently, the merchant 106 need not receive any details about the financial account of the customer 102 for the transaction to be processed. As one example, the electronic payment may be charged to a credit card issuer or credit card number that the customer 102 provided when signing up with the service of the computing device(s) 112 for an electronic payment account. As another example, the customer 102 may have a quantity of money pre-paid in an account maintained for use in making the electronic payments. Other variations will also be apparent to those of skill in the art having the benefit of the disclosure herein.

Before conducting an electronic payment transaction, the customer 102 typically creates a customer account with the service of the computing device(s) 112. The customer 102 can create the customer account, for example, by interacting with an application of the customer device(s) 104 that is configured to perform electronic payment transactions and that may execute on the customer device(s) 104 (e.g. the payment service interface 122). When creating an electronic payment account with the service of the computing device(s) 112, the customer 102 may provide an image including the face of the customer 102, data describing a financial account of the customer 102 (e.g., payment information, such as a credit card number, expiration date, etc.), and a billing address. This customer information can be securely stored by the computing device(s) 112, for example, in the customer account information 162 in the database(s) 160. Further, the customer account information 162 may be created for each customer 102, which may include information about the customer 102 and transactions conducted by the customer.

To accept electronic payments for POS transactions, the merchant 106 may create a merchant account with the service of the computing device(s) 112 by providing information describing the merchant including, for example, a merchant name, contact information, e.g., telephone numbers, the merchant's geographic location address, and one or more financial accounts to which funds collected from customer(s) 102 will be deposited. This merchant information 164 can be securely stored by the service, for example, in the database(s) 160 along with the customer account information 162. Further, a merchant profile (and/or buyer profile) may be created for each merchant, which may include information about the merchant and transactions conducted by the merchant.

The service of the computing device(s) 112 may be configured to enable electronic payments for transactions. The computing device(s) 112 can include one or more servers that are configured to perform secure electronic financial transactions, e.g., electronic payments for transactions between a customer and a merchant, for example, through data communicated between the customer device(s) 104 and the merchant device(s) 108. Generally, when a customer 102 and a merchant 106 enter into an electronic payment transaction, the transaction is processed by electronically transferring funds from a financial account associated with the customer account to a financial account associated with the merchant account. Alternatively, the customer 102 may have a balance of funds maintained by the payment service as part of the customer account which may be used in transactions.

The payment module 150 may be configured to send and receive data to and from the customer device(s) 104 and the merchant device(s) 108. For example, the payment module 150 can be configured to send information describing merchant(s) 106 to the application on the customer device(s) 104 using, for example, the information stored in the database(s) 160. For example, the payment module 150 can communicate data describing merchant(s) 106 that are within a threshold geographic distance from a geographic location of the customer device(s) 104. The data describing the merchant(s) 106 can include, for example, a merchant name, geographic location, contact information, and an electronic catalogue, e.g., a menu that describes items that are available from the merchant.

The computing device(s) 112 can also be configured to communicate with one or more card payment network computing devices(s) 156 of a card payment network (e.g., MasterCard®, VISA®) over the one or more network(s) 110 to conduct financial transactions electronically. The computing device(s) 112 can also communicate with one or more bank computing devices 158 of one or more banks over the one or more network(s) 110. For example, the computing device(s) 112 may communicate with an acquiring bank, and/or an issuing bank, and/or a bank maintaining customer accounts for electronic payments.

An acquiring bank may be a registered member of a card association (e.g., Visa®, MasterCard®), and may be part of a card payment network. An issuing bank may issue payment cards to customers, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the customer may use a debit card or gift card instead of a credit card, in which case, the bank computing device(s) of a bank or other institution corresponding to the debit card or gift card may receive communications regarding a transaction in which the customer is participating. Additionally, there may be computing devices of other financial institutions involved in some types of transactions or in alternative system architectures, and thus, the foregoing are merely several examples for discussion purposes. In addition, the merchant device(s) 108 may perform interactions similar to those described above with regard to the card payment network computing devices(s) 156 of a card payment network and the bank computing devices 158 when processing transactions for payment instruments that do not involve the payment service of the computing device(s) 112.

In some instances, the computing device(s) may further perform data analysis in order to generate/identify connection(s) 170 between merchant(s) 106, and then provide customer(s) 102 with recommendations based on the connections. For instance, customer(s) 102 may conduct subsequent transactions with respective merchant(s) 106 over given time periods. For instance, a customer 102 may conduct a first transaction with a first merchant 106 and subsequent to the first transaction, conduct a second transaction with a second merchant 106. In some instances, the customer(s) 102 may conduct the subsequent transactions with the respective merchant(s) 106 based on of respective types of business that are associated with each of the merchant(s) 106 (e.g., categories of item(s)/service(s) provided by the merchants 106). For example, a customer 102 may conduct a first transaction at a first merchant 106 that provides coffee at 6:00 a.m. in the morning followed by conducting a second transaction at a second merchant 106 that provides a breakfast bagel at 6:15 a.m. For another example, a customer 102 may conduct a first transaction at a first merchant 106 in which the customer purchases golf clubs. Later that same week, the customer 102 may conduct a second transaction at a second merchant 106 in which the customer purchases a round of golf.

In either of the examples, the customer 102 conducts subsequent transactions with the respective merchant(s) 106 based on the category of items/services 172 provided by each of the merchant(s) 106. For instance, in the first example, the customer 102 purchases a first item 172 from the first merchant 106, coffee, which is associated with breakfast. Later in the morning, the customer 102 then purchases a second item 172 from the second merchant 106, a bagel, which is also associated with breakfast. Since the coffee and the bagel are each associated with breakfast, the coffee and bagel may be associated with a specific category of items/services 172 (e.g., breakfast items). Additionally, for the second example, the customer 102 purchases a first item 172 form the first merchant 106, golf clubs, which are associated with golfing. The customer 102 then purchases a first service 172 from a second merchant 106, a round of golf, which is also associated with golfing. Since the golf clubs and the round of golf are each associated with golfing, the golf clubs and the round of golf are associated with a specific category of items/services (e.g., golfing items/services).

In some instance, the computing device(s) 112 can perform data analysis in order to generate connection(s) 170 between merchant(s) 106 based on transaction information 168. For instance, the computing device(s) 112 can receive transaction information 168 from merchant device(s) 108 associated with respective merchant(s) 106. As discussed above, the transaction information 168 can include both buyer information and item information that describes transactions between the merchant(s) 106 and customer(s) 102. For instance, the transaction information 168 for a respective transaction can indicate an identifier of the merchant 106, an identifier (e.g., name) of the customer 102, payment information associated with a payment instrument 174 used by the customer 102 during the respective transaction, item(s)/service(s) 172 acquired by the customer 102 during the respective transaction, a cost of the item(s)/service(s)

172 acquired by the customer 102 during the respective transaction, a time, place and date of the respective transaction, and so forth.

In some instances, the computing device(s) 112 can associate the transaction information 168 for respective transactions with one or more profile(s) 166. For example, the computing device(s) 112 can associate transaction information 168 describing transactions that occur at a specific merchant 106 with a profile 166 (e.g., a buyer profile 166) associated with the merchant 106. For another example, the computing device(s) 112 can associate transaction information 168 describing transactions performed by a specific customer 102 with a profile 166 associated with the customer 102. Additionally, for another example, the computing device(s) 112 can associate transaction information 168 describing transactions in which customer(s) 102 acquired a specific category of item(s) 172 (e.g., breakfast item, sporting equipment, etc.) and/or specific category of service(s) (e.g., cleaning service, taxi service, etc.) with a profile 166 that is associated with the specific category of item(s)/service(s). Furthermore, for another example, the computing device(s) 112 can associate transaction information 168 describing transactions that occur at a specific type of merchant 106 (e.g., restaurant, sporting goods retailer, etc.) with a profile 166 associated with the specific type of merchant 106.

The either of the examples above, each of the profile(s) 166 can thus be associated with buyer information and item information for at least one transaction. For instance, a profile 166 (e.g., a buyer profile 166) associated with a specific merchant 106 can be associated with buyer information indicating identities of respective customer(s) 102 that have conducted at least one transaction with the specific merchant 106, payment information associated with payment instrument(s) 174 used by the respective customer(s) 102, geographical locations associated with the respective customer(s) 102, a time, place, and date of the respective transactions, or the like. The profile 166 can further be associated with item information that indicates item(s) 174 acquired by the respective customer(s) 102 during the respective transactions, service(s) 172 acquired by the respective customer(s) 102 during the respective transactions, a cost of the item(s) 172 acquired by the customer(s) 102 during the respective transactions, a cost of the service(s) 172 acquired by the customer(s) 102 during the respective transactions, or the like.

The computing device(s) 112 can then analyze the transaction information 168 and/or the one or more profile(s) 166 using the connection module 152 to identify relationships between merchant(s) 106. For example, the connection module 152 may function to identify merchant(s) 106 that have each conducted a respective transaction with a customer 102. For another example, the connection module 152 may function to identify merchant(s) 106 that have each conducted respective transactions with multiple customer(s) 102. In some instances, the connection module 152 functions to identify the relationships by searching through the transaction information 168 to identify similarities between transactions. For instance, the connection module 152 can identify transactions that each include a similar merchant 106, a similar customer 102, similar payment information associated with a payment instrument 174 used by the customer 102, similar item(s)/service(s) 172 acquired by the customer 102, a similar cost of the item(s)/service(s) 172 acquired by the customer 102, a similar time, place and date, and so forth.

The computing device(s) 112 can then utilize the connection module 152 to generate connection(s) 170 between merchants 106 based on the relationships. In some instances, the connection(s) 170 can include general connections 170 and interrelated connections 170. A general connection 170 can include a connection 170 between merchants 106 that the connections module 152 generates based on at least one customer 102 conducting respective transactions at each of the merchants 106. For example, the connection module 152 can generate a general connection 170 between a first merchant 106 and a second merchant 106 based on at least one customer 102 conducting respective transactions at the first merchant 106 and the second merchant 106. An interrelated connection 170 can include a connection 170 between merchants 106 that the connection module 152 generates based on both at least one customer 102 conducting respective transactions at each of the merchants 106, and an order in which the at least one customer 102 conducts respective transactions. For example, the connection module 152 can generate an interrelated connection 170 between a first merchant 106 and a second merchant 106 based on at least one customer 102 conducting a first transaction at the first merchant 106 and, after conducting the first transaction, conducting a second transaction (e.g., subsequent transaction) at the second merchant 106.

In some instances, when generating interrelated connections 170 between merchants 106, the connection module 152 may set a threshold number of transactions (e.g., zero, one, two, three, etc.) that can occur between the first transaction and the subsequent transaction. For example, the connection module 152 may generate an interrelated connection 170 between a first merchant 106 and a second merchant 106 when at least one customer 102 conducts five or less transactions with other merchant(s) 106 between conducting a first transaction with the first merchant 106 and a subsequent transaction with the second merchant 106. For another example, the connection module 152 may generate an interrelated connection 170 between a first merchant 106 and a second merchant 106 when at least one customer 102 conducts ten or less transactions with other merchant(s) 106 between conducting a first transaction with the first merchant 106 and a subsequent transaction with the second merchant 106.

Additionally or alternatively, in some instances, when generating interrelated connections 170 between merchants 106, the connection module 152 may specify a threshold period of time (e.g., minute, hour, day, week, year, etc.) that can pass between the first transaction and the subsequent transaction. For example, the connection module 152 may generate an interrelated connection 170 between a first merchant 106 and a second merchant 106 when at least one customer 102 conducts a subsequent transaction with the second merchant 106 within one week of conducting a first transaction with the first merchant 106. For another example, the connection module 152 may generate an interrelated connection 170 between a first merchant 106 and a second merchant 106 when at least one customer 102 conducts a subsequent transaction with the second merchant 106 within one month of conducting a first transaction with the first merchant 106.

Additionally or alternatively, in some instances, the connection module 152 may use other factors when generating interrelated connections 170 between merchants 106. For example, the connection module 152 may utilize a threshold distance (e.g., block, mile, ten miles, etc.) when between merchants 106 when generating an interrelated connection 170. For instance, the connection module 152 only may generate an interrelated connection 170 between merchants 106 only when a distance between the merchants 106 is no further than a mile. For another example, the connection module 152 may utilize a respective type of business associated with each of the merchants 106 when generating interrelated connections 170 between merchants 106. For instance, the connection module 152 may generate an interrelated connection 170 between merchant(s) 106 only when the merchant(s) 106 each sell a similar category of item(s)/service(s). For instance, the connection module 152 may only generate an interrelated connection 170 between merchants 106 when the merchants 106 each provide a similar category of item(s)/service(s) and/or when the merchants 106 provide related item(s)/service(s).

For instance, merchants 106 can each provide a similar category of item(s) 172 when each of the merchants 106 provides sporting goods, groceries, electronics, or the like. Merchants 106 can each provide a similar category of service(s) 172 when each of the merchants 106 provide golfing lessons, maid services, catering services, or the like. Additionally, merchants 106 can provide related item(s)/service(s) 172 when the merchants 106 provide item(s)/service(s) 172 that customers 102 acquire during subsequent transactions. For instance, and using the examples above, the first merchant 106 that sells coffee provides related item(s)/service(s) 172 as the second merchant 106 that provides bagels, as customer(s) 102 may purchase bagels subsequently to purchasing coffee. Additionally, the first merchant 106 that sells golf clubs provides related item(s)/service(s) 172 as the second merchant 106 that provides a round of golf, as customer(s) 102 may purchase a round of golf subsequently to purchasing golf clubs.

In some instances, the connection module 152 may generate the connection(s) 170 using one or more threshold values. For example, the connection module 152 may generate a general connection 170 between a first merchant 106 and a second merchant 106 based on a threshold number of customer(s) 102 each conducting respective transactions at the first merchant 106 and the second merchant 106. For another example, the connection module 152 may generate an interrelated connection 170 between a first merchant 106 and a second merchant 106 based on a threshold number of customer(s) 102 each conducting a first transaction at the first merchant 106 followed by conducting a subsequent transaction at the second merchant 106. In some instance, when using the threshold value, the connection module 152 first calculates/determines a value associated with a number of customer(s) 102 that have conducted transactions that satisfy the connection 170. The connection module 152 then compares the value to the threshold value in order to determine whether the threshold is satisfied (e.g., exceeded by the value).

For example, the connection module 152 may set the threshold value for interrelated connections 170 at ten customer(s) 102. Using the threshold value, the connection module 152 can then generate an interrelated connection 170 between a first merchant 106 and a second merchant 106 when at least ten customer(s) 102 each conduct a first transaction at the first merchant 106 and after conducting the first transaction, conduct a subsequent transaction at the second merchant 106. For another example, the connection module 152 may set the threshold value for interrelated connections 170 to include ten percent of customer(s) 102. Using the threshold value, the connection module 152 can then generate an interrelated connection 170 between a first merchant 106 and a second merchant 106 when at least ten percent of the customer(s) 102 that conduct respective first transactions at the first merchant 106 later conduct respective subsequent transactions at the second merchant 106.

Using the connection(s) 170, the computing device(s) 112 can then send recommendations to merchant(s) 106 and/or customer(s) 102. For instance, the computing device(s) 112 may receive an indication that a customer 102 is conducting a transaction with a first merchant 106. In some instances, receiving the indication can include receiving, from a merchant device 108 of the first merchant 106, a request to authorize a payment instrument 174 of the customer 102 for a cost of the first transaction between the first merchant 106 and the customer 102. Based on receiving the indications, the computing device(s) 112 can identify at least one connection 170 between the first merchant 106 and at least one other merchant 106. For instance, the computing device(s) 112 can utilize the analysis module 154 identify one or more general connections 170 and/or one or more interrelated connections 170 between the first merchant 106 and one or more other merchant(s) 106. The computing device(s) 112 can then use the one or more connection(s) 170 to determine which merchant(s) 106 to recommend to the customer 102 for conducting one or more subsequent transactions.

In some instances, to determine which merchant(s) 106 to recommend to the customer 102, the analysis module 154 may use information associated with the customer 102. The information can include a geographic location associated with the customer 102 (e.g., an address), a geographic location associated with a customer device 104 of the customer 102 (e.g., Global Positioning System (GPS) location), transaction information 168 associated the customer 102, a gender of the customer 102, an age of the customer 102, an income level for the customer 102, or the like. In some instances, the computing device(s) 112 can store the information in association with an identity of the customer 102. For instance, the computing device(s) 112 can store the information in association with a profile 166 of the customer 102. In some instances, the computing device(s) 112 may receive the information along with the indication that the customer 102 is conducting the first transaction with the first merchant 106.

In some instances, the analysis module 154 can then use the information to recommend merchant(s) 106 to the customer 102 that change the behavior of the customer 102. For example, to determine a merchant 106 using the information, the analysis module 154 can determine that the customer 102 usually conducts transactions at the first merchant 106 followed by conducting subsequent transactions at a second merchant 106. Based on the determination, the analysis module 154 can send the customer 102 a message (e.g., an electronic communication) recommending that the customer 102 conduct a subsequent transaction with at least one merchant 106 other than the second merchant 106. For instance, the analysis module 154 can identify a connection 170 that indicates that a threshold number of customer(s) 102 each conduct a first transaction at the first merchant 106 and after conducting the first transaction, conduct a subsequent transaction at a third merchant 106. The analysis module 154 can determine to send the customer 102 a message recommending that the customer 102 conduct a subsequent transaction at the third merchant 106.

For a second example, the analysis module 154 can determine that a connection 170 indicates that at least one other customer 102 routinely conducts a first transaction at the first merchant 106 and, after conducting the first transaction, conducts a subsequent transaction at a second merchant 106. The analysis module 154 can further analyze the transaction information 168 associated with the customer 102 to determine that the transaction information 168 does not indicate that the customer 102 has conducted a transaction with the second merchant 106. Based on the connection 170 between the first merchant 106 and the second merchant 106, and based on determining that the transaction information 168 does not indicate that the customer 102 has conducted a transaction with the second merchant 106, the analysis module 154 can determine to send the customer 102 a message recommending that the customer 102 conduct a subsequent transaction at the second merchant 106.

Additionally, for a third example, based on the transaction information 168, the analysis module 154 can determine that the customer 102 usually conducts transactions at the first merchant 106 followed by conducting subsequent transactions at a second merchant 106, where the second merchant 106 is associated with a specific type of business. The analysis module 154 can then identify a connection 170 that indicates that at least one other customer 102 conducts transactions at the first merchant 106 followed by conducting transactions at a third merchant 106, where the third merchant 106 is also associated with the specific type of business. Based on the connection 170 between the first merchant 106 and the third merchant 106, and based on the first merchant 106 and the third merchant 106 being associated with the specific type of business, the analysis module 154 can determine to send the customer 102 a message recommending that the customer 102 conduct a subsequent transaction at the third merchant 106.

In addition to using the information associated with the customer 102 to recommend merchant(s) 106, the analysis module 154 can use information associated each of the one or more other merchant(s) 106 to determine which merchant(s) 106 to recommend to the customer 102. For example, the analysis module 154 can recommend a merchant 106 that includes the highest customer rating among the one or more merchant(s) 106. For another example, the analysis module 154 can recommend merchant(s) 106 that are within a threshold distance (e.g., a bock, a mile, ten miles, etc.) of a location associated with the first merchant 106 and/or a location associated with the customer 102 (e.g., the address of the customer 102, the location of a customer device 104 associated with the customer 102, etc.). Still, for another example, the analysis module 154 can recommend merchant(s) 106 that provide similar categories of item(s)/service(s) 172 and/or related item(s)/service(s) 172 as the first merchant 106.

For example, the analysis module 154 can identify a connection 170 between the first merchant 106 and a second merchant 106 that indicates that customer(s) 102 that conduct respective transactions at the first merchant 106 subsequently conduct respective transactions at the second merchant 106. The analysis module 154 can further identity that the first merchant 106 provides item(s)/service(s) 172 that are related to item(s)/service(s) 172 provided by the second merchant 106. For instance, the analysis module 154 can determine that customer(s) 102 that purchase the category of item(s)/service(s) 172 provided by the first merchant 106 subsequently purchase the category of item(s)/service(s) 172 provided by the second merchant 106. Based on the connection 170, and based on the relationship between the item(s)/service(s) 172, the analysis module 154 may determine to recommend the second merchant 106.

In some instances, the computing device(s) 112 can further communicate with the one or more other merchant(s) 106 to determine which merchant(s) 106 to recommend to the customer 102. For instance, the computing device(s) 112 can send messages (e.g., electronic communications) to each of the one or more other merchant(s) 106 that indicate that the computing device(s) 112 is going to recommend merchant(s) 106 to the customer 102. In some instances, the messages can each indicate the connection 170 between the first merchant 106 and the respective merchant(s) 106. In response, the computing device(s) 112 can receive one or more messages from the merchant(s) 106, where each message requests that the computing device(s) 112 recommend a respective merchant 106. The computing device(s) 112 can then determine to recommend the merchant(s) 106 based on the one or more messages.

For example, the computing device(s) 112 can determine which merchant(s) 106 to recommend based on an order in which the computing device(s) 112 receive the one or more messages from the one or more merchant(s) 106. For instance, the computing device(s) 112 recommend the merchant 106 that sends the first message to the computing device(s) 112. For another example, the computing device(s) 112 can determine which merchant 106 to recommend based on bids from the responding merchant(s) 106. For instance, when one or more of the merchant(s) 106 respond to the computing device(s) 112, the payment service can recommend the merchant 106 that bids the highest amount for the recommendation.

After determining at least one merchant 106 to recommend for the subsequent transaction, the computing device(s) 112 can send the message that recommends the merchant 106. In some instances, the computing device(s) 112 can send a message 176 to the merchant device(s) 108 of the first merchant 106. The merchant device(s) 108 can then receive the message 176 from the computing device(s) 112 and, in response, provide the message 176 to the customer 102. In some instances, providing the message 176 can include displaying the message 176 to the customer 102 using the display 132. In some instances, providing the message 176 can include adding the message 176 to a receipt that is provided to the customer 102. For instance, the merchant device(s) 108 may print the message 176 on a physical receipt, and/or the merchant device(s) 108 may add the message 176 to a digital receipt.

In some instances, the computing device(s) 112 can send a message 178 to the customer 102 that recommends the merchant 106. For instance, the computing device(s) 112 can use contact information associated with the customer 102, such as an email address, telephone number, home address, fax number, or the like, to send the message 178 to the customer 102. For example, if the contact information includes an email address, the computing device(s) 112 can generate an email that recommends that the customer 102 conduct a subsequent transaction at least one other merchant 106. The computing device(s) 112 can then send the email to the customer 102 using the email address. For another example, if the contact information includes a telephone number, the computing device(s) 112 can generate a text message that recommends that the customer 102 conduct a subsequent transaction with at least one other merchant 106. The computing device(s) 112 can then send the text message to the customer device 104 using the telephone number.

Still, in some instances, the computing device(s) 112 can send the message 178 to the customer device 104 via the application executing on the customer device 104. For instance, as discussed above, the customer device 104 may execute an application that provides the customer 102 with POS functionality. For instance, the application can provide the customer 102 a list of merchant(s) 106, where each of the merchant(s) 106 includes a respective account with the computing device(s) 112. The customer 102 can then use the application to conduct transactions with respective merchant(s) 106. Additionally, the computing device(s) 112 can send the message 178 that recommends that the customer 102 conduct a subsequent transaction with at least one other merchant 106 via the application. For instance, the computing device(s) 112 can send the customer device 104 a push notification that recommends the at least one other merchant 106 via the application.

In some instances, the computing device(s) 112 can send the message 178 to the customer 102 at one or more determined times. A determined time an include specific time, such as 3:00 a.m. on Monday, or a determined time can include a time interval, such as Monday between 3:00 a.m. and 5:00 a.m. In some instances, to determine the one or more times, the computing device(s) 112 can use the connection(s) 170 between the merchants 106. For instance, the analysis module 154 can analyze transaction information 168 that indicates a connection 170 between the first merchant 106 and a second merchant 106 to determine a time interval (e.g., an average time interval) between when at least one customer 102 conducts a first transaction at the first merchant 106 and then conducts a subsequent transaction at the second merchant 106. The computing device(s) 112 can then use the time interval to determine the one or more times for sending the message 178.

For example, the time interval can indicate that the at least one customer 102 conducts the subsequent transaction with the second merchant 106 within one hour after conducting the first transaction with the first merchant 106. Based on the time interval, the computing device(s) 112 can determine to send the customer 102 one or more message(s) 178 within one hour of the customer 102 conducting the first transaction at the first merchant 106. For another example, the time interval can indicate that the at least one customer 102 conducts the subsequent transaction with the second merchant 106 within one month after conducting the first transaction with the first merchant 106. Based on the time interval, the computing device(s) 112 can determine to send the customer 102 one or more message(s) 178 within one month of the customer 102 conducting the first transaction with the first merchant 106.

In some instances, in addition to, or alternatively from, sending customer(s) 102 messages that recommend merchant(s) 106, the computing device(s) 112 can further send messages that recommend item(s)/service(s)/preference(s) for the customer(s) 102. For instance, the connection module 152 can analyze the transaction information 168 to generate connection(s) 170 between items 172 and/or services 172 that customer(s) 102 acquire from one or more merchant(s) 106. In some instances, the connection(s) 170 can indicate item(s)/service(s) 172 that customer(s) 102 acquire during respective transactions with merchant(s) 106.

For example, the connection module 152 can analyze the transaction information 168 to determine that, during one or more transactions with a first merchant 106, a customer 102 orders a first item/service 172 and a second item/service 172 from the first merchant 106. Based on the determination, the connection module 152 can generate a connection 170 between the first item/service 172 and the second item/service 172 for the customer 102. For another example, the connection module 152 can analyze the transaction information 168 to determine that, during respective transactions with merchant(s) 106, customer(s) 102 each order a first item/service 172 and a second item/service 172 from the merchant(s) 106. Based on the determination, the connection module 152 can generate a connection 170 a connection between the first item/service 172 and the second item/service 172.

In some instances, the connection module 152 can further analyze the transaction information 168 to generate connection(s) 170 between item(s)/service(s) 172 and preference(s) for customer(s) 102, where preference(s) include any requests made by the customer(s) 102 when acquiring the item(s)/service(s) 172 from the merchant(s) 106. For example, the connection module 152 can analyze the transaction information 168 to determine that, during one or more transactions with a first merchant 106, a customer 102 orders an item 172 (e.g., coffee) and provides a preference for the item 172 (e.g., extra cream). Based on determination, the connection module 152 can generate a connection 170 between the item 172 and the preference for the customer 102. For another example, the connection module 152 can analyze the transaction information 168 to determine that, during respective transactions with merchant(s) 106, customer(s) 102 each order an item 172 (e.g., a bagel) and provide a preference for the item 172 (e.g., toasted). Based on the determination, the connection module 152 can generate a connection 170 between the item 172 and the preference.

The computing device(s) 112 can then use the connection(s) 170 to send recommendations to customer(s) 102. For instance, the computing device(s) 112 can receive an indication that a customer 102 is ordering a first item 172 from a merchant 106 during a transaction. The analysis module 154 can then analyze the connection(s) 17099 to identify a connection 170 that indicates that the customer 102 ordered a second item 172 along with the first item 172 from at least one other merchant 106 during respective transactions. Based on the connection 170, the computing device(s) 112 can either send the merchant device 108 of the merchant 106 a message 174 recommending that the customer 102 order the second item 172, or the computing device(s) 112 can send the customer device 104 associated with the customer a message 178 recommending that the customer 102 order the second item 172 from the merchant 106.

In some instances, before sending the message, the computing device(s) 112 can first determine that the customer 102 does not ordinarily order the second item 172 from the merchant 106. For instance, the analysis module 154 can analyze the transaction information 168 and determine that the transaction information 168 does not indicate that the customer 102 has ordered the second item 172 from the merchant 106. Based on the determination, the computing device(s) 112 can determine to send the message recommending the second item 172 to the customer 102.

As discussed above, the analysis module 154 can analyze transaction information 168 to determine that a customer 102 has not conducted a transaction with a merchant 106. In some instances, the analysis module 154 can make the determination based on determining that the transaction information 168 does not describe a transaction between the customer 102 and the merchant 106. Additionally or alternatively, in some instances, the analysis module 154 can make the determination based on determining that transaction information 168 associated with a profile 166 of the merchant 102 does not describe a transaction between the customer 102 and the merchant 106. In other words, in either instance, the transaction information 168 may indicate that the customer 102 has not conducted a transaction with the merchant 106.

As described herein, memory, such as memory 116, memory 128, and memory 142, may be an example of tangible non-transitory computer storage media and may include volatile and nonvolatile memory and/or removable and non-removable media implemented in any type of technology for storage of information such as computer-readable processor-executable instructions, data structures, program modules or other data. The memory may include, but is not limited to, RAM, ROM, EEPROM, flash memory, solid-state storage, magnetic disk storage, optical storage, and/or other computer-readable media technology. Further, in some cases, the electronic devices, such as the customer device(s) 104, the merchant device(s) 108, and the computing device(s) 112, may access external storage, such as RAID storage systems, storage arrays, network attached storage, storage area networks, cloud storage, or any other medium that can be used to store information and that can be accessed by the respective processor(s) of the electronic devices either directly or through another computing device or network. Accordingly, the memory may be computer storage media able to store instructions, modules or components that may be executed by the processor(s). Further, when mentioned, non-transitory computer-readable media exclude media such as energy, carrier signals, electromagnetic waves, and signals per se.

Figure 2:
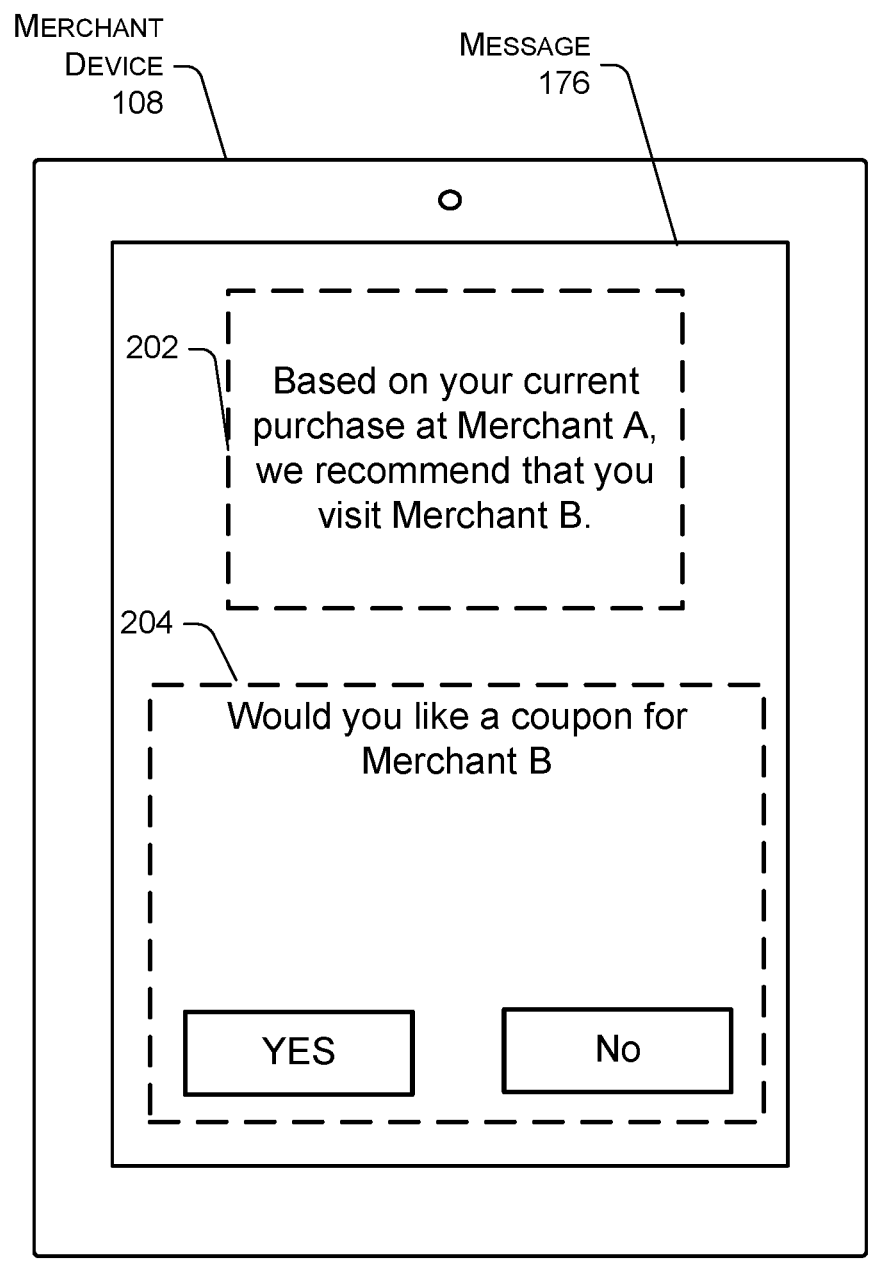
FIG. 2 is an example illustration of a merchant device providing a recommendation to a customer.

FIG. 2 is an example illustration of a merchant device 108 providing a recommendation to a customer, such as one of customer(s) 102. As shown, the merchant device 108 displays the message 176 to the customer 102. The message 176 includes a recommendation 202 that the customer 102 visit Merchant B based on a transaction that the customer 102 is conducting at Merchant A. Additionally, the message 176 includes an option for the customer 102 to receive a coupon for Merchant B. For instance, the customer 102 can select "YES" to receive the coupon from the merchant device 108, or the customer 102 can select "NO" to not receive the coupon from the merchant device 108.

Figure 3:
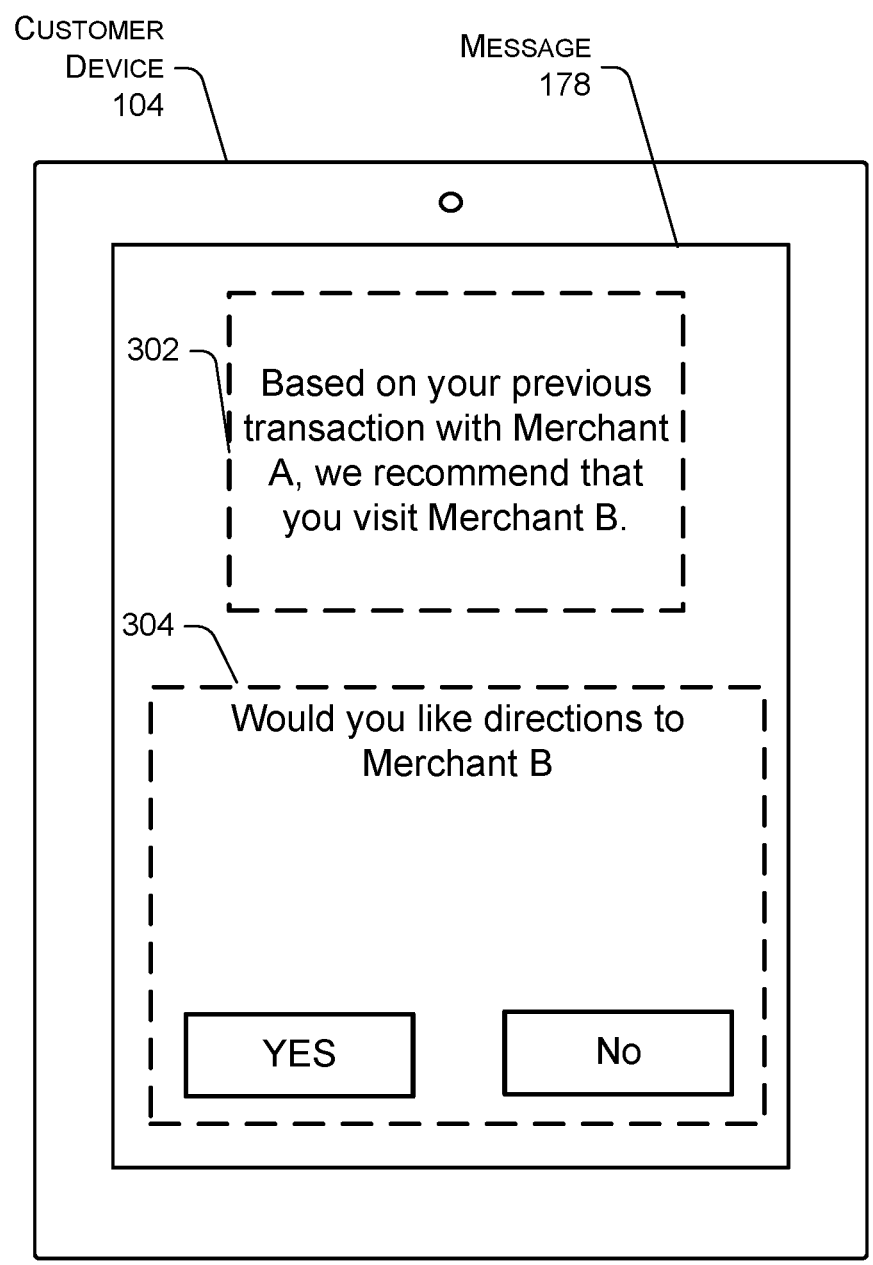
FIG. 3 is an example illustration of a customer device providing a recommendation to a customer.

FIG. 3 is an example illustration of a customer device 104 providing a recommendation to a customer, such as one of customer(s) 102. As shown, the customer device 104 displays the message 178 to the customer 102. The message 178 includes a recommendation 302 that the customer 102 visit Merchant B based on a previous transaction that the customer 102 conducted at Merchant A. Additionally, the message 178 includes an option for the customer 102 to receive directions to Merchant B. For instance, the customer 102 can select "YES" to receive the directions to Merchant B, or the customer 102 can select "NO" to not receive the directions to Merchant B.

Figure 4A:
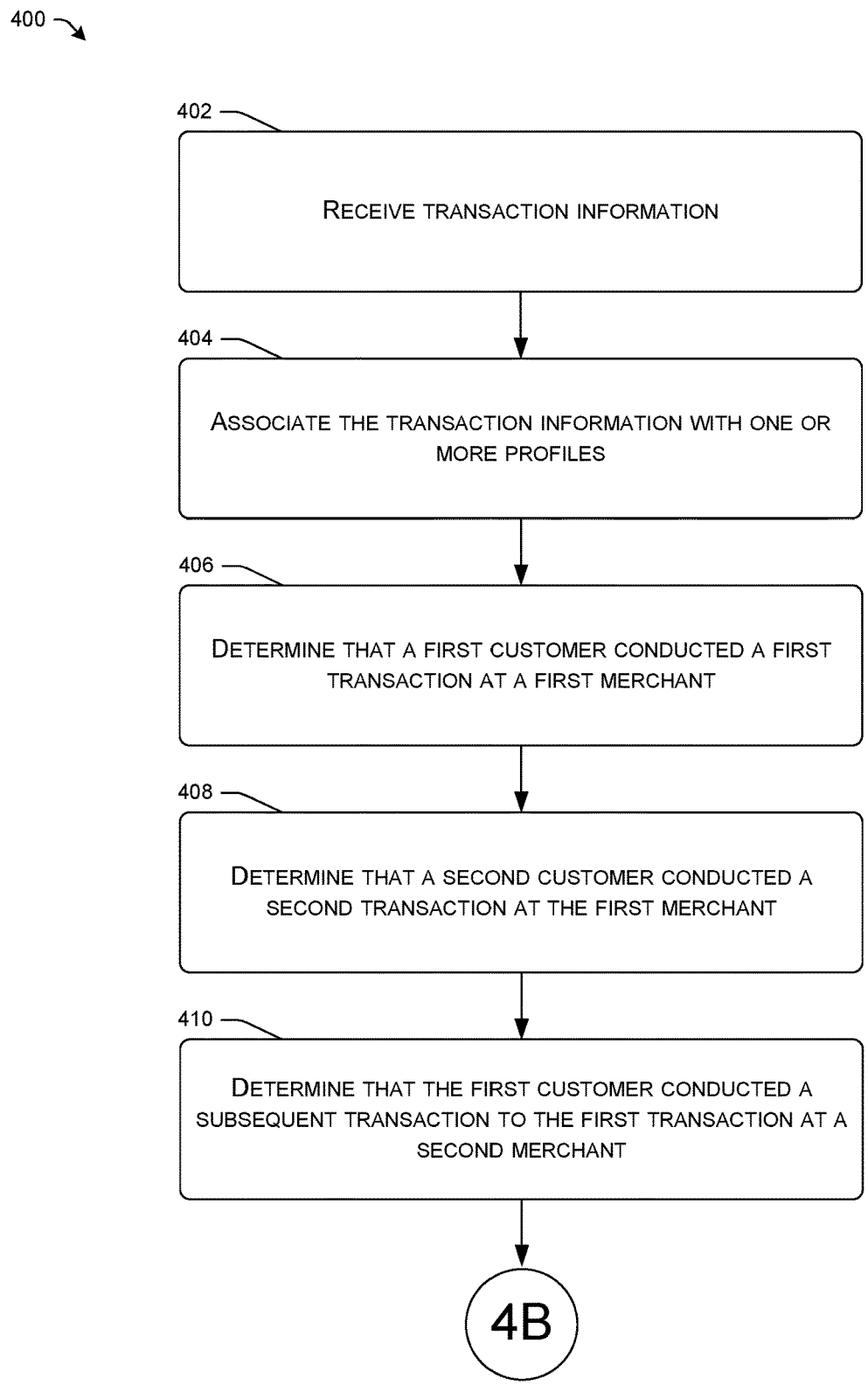
FIGS. 4A-4B illustrate a flow diagram of an example process for performing data analysis in order generate connection(s) between merchants. The example process further includes sending a recommendation to a customer based on the connection(s).
Figure 4B:
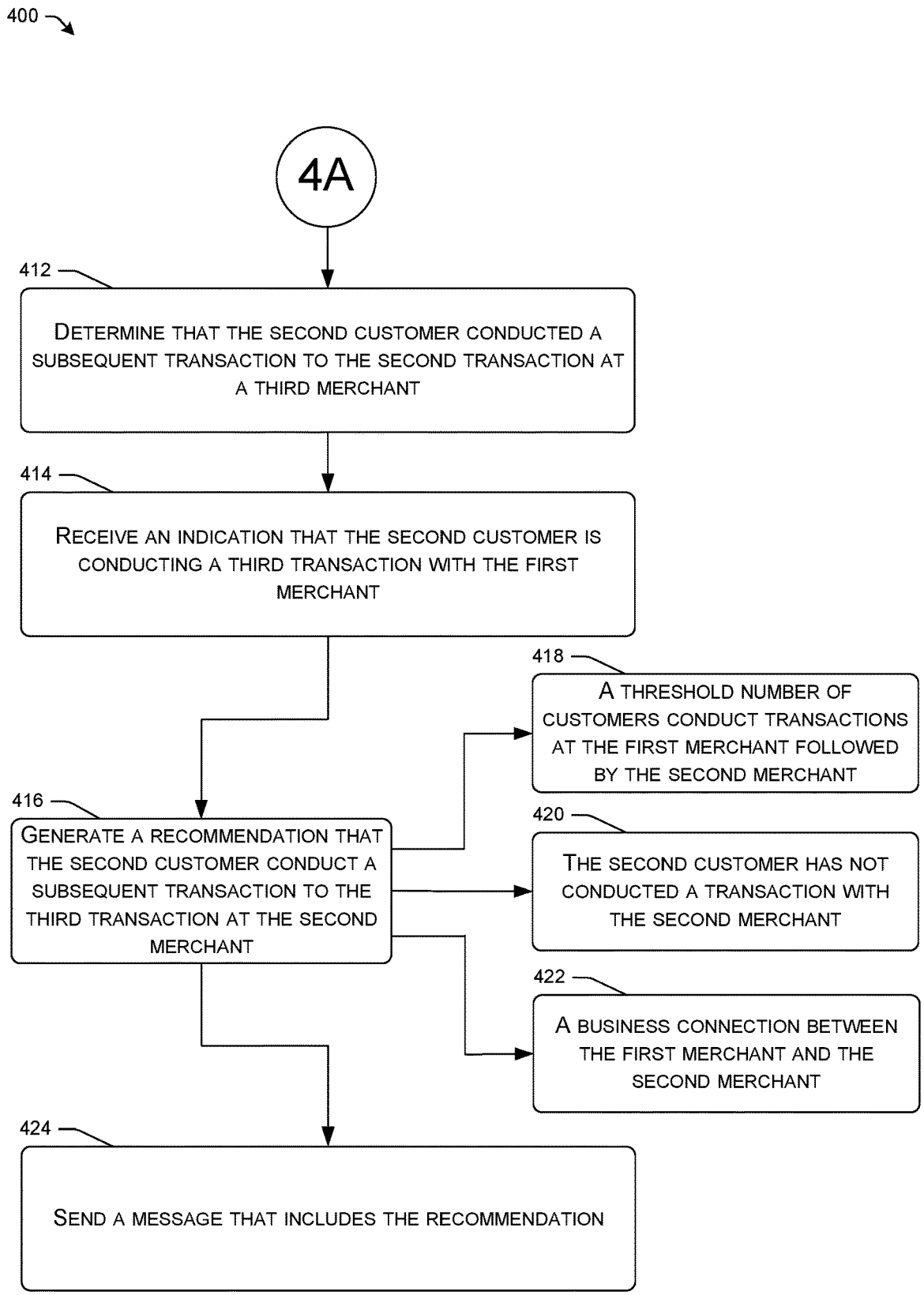

FIGS. 4A-4B illustrate a flow diagram of an example process 400 for performing data analysis in order generate connection(s) between merchants. The example process 400 further includes sending a recommendation to a customer based on the connection(s). The process 400, and other processes described herein, are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. The process 400, and other processes described herein, may be performed by a payment service (e.g., the computing device(s) 112), a merchant device (e.g., merchant device(s) 108), a customer device (e.g., customer device 104), an additional electronic device, or by a combination thereof.

At 402, the computing device(s) 112 receives transaction information. For instance, the computing device(s) 112 can receive transaction information from merchant device(s) associated with respective merchant(s). As discussed above, the transaction information can include both buyer information and item information that describes transactions between the merchant(s) and customer(s). For instance, the transaction information for a respective transaction can indicate an identifier of the merchant, an identifier (e.g., name) of the customer, payment information associated with a payment instrument used by the customer during the respective transaction, item(s)/service(s) acquired by the customer during the respective transaction, a cost of the item(s)/service(s) acquired by the customer during the respective transaction, a time, place and date of the respective transaction, and so forth.

At 404, the computing device(s) 112 associate the transaction information with one or more profiles. For instance, the computing device(s) 112 can associate transaction information describing transactions that occur at merchant(s) with a respective profile associated with each of the merchant(s). As such, the profile(s) can thus be associated with buyer information and item information for at least one transaction. For instance, a profile associated with a merchant can be associated with buyer information indicating identities of respective customer(s) that have conducted at least one transaction with the merchant, payment information associated with payment instrument(s) used by the respective customer(s), geographical locations associated with the respective customer(s), a time, place, and date of the respective transactions, or the like. The profile can further include item information that indicates item(s)/service(s) acquired by the respective customer(s) during the respective transactions, and a cost of the item(s)/service(s) acquired by the customer(s) during the respective transactions.

At 406, the computing device(s) 112 determine that a first customer conducted a first transaction at a first merchant and at 408, the computing device(s) 112 determine that a second customer conducted a second transaction at the first merchant. For instance, the computing device(s) 112 can analyze the transaction information and/or the one or more profiles to determine that both the first customer and the second customer have conducted respective transactions at the first merchant. In some instances, the analyzing can include identifying a profile associated with the first merchant, and then analyzing transaction information associated with the profile to determine that the transaction information describes the first transaction with the first customer and the second transaction with the second customer.

At 410, the computing device(s) 112 determine that the first customer conducted a subsequent transaction to the first transaction at a second merchant. For instance, the computing device(s) 112 can analyze the transaction information and/or the one or more profiles to determine that the first customer conducted the subsequent transaction at the second merchant. In some instances, the analyzing can include identifying a profile associated with the second merchant, and then analyzing transaction information associated with the profile to determine that the transaction information describes the subsequent transaction. In some instances, the computing device(s) 112 can use a similar process to determine that each of a threshold number of customers conducted a first transaction at the first merchant followed by a subsequent transaction at the second merchant.

At 412, the computing device(s) 112 determine that the second customer conducted a subsequent transaction to the third transaction at a third merchant. For instance, the computing device(s) 112 can analyze the transaction information and/or the one or more profiles to determine that the second customer conducted the subsequent transaction at the third merchant. In some instances, the analyzing can include identifying a profile associated with the third merchant, and then analyzing transaction information associated with the profile to determine that the transaction information describes the subsequent transaction.

At 414, the computing device(s) 112 receive an indication that the second customer is conducting a third transaction at the first merchant. For instance, the computing device(s) 112 can receive a request to authorize a payment instrument of the second customer for a cost of the third transaction. In some instances, the computing device(s) 112 receive the request from a merchant device associated with the first merchant. In some instances, the computing device(s) 112 receive the request from a customer device associated with the second customer.

At 416, the computing device(s) 112 generate a recommendation that the second customer conduct a subsequent transaction to the third transaction at the second merchant. For instance, the computing device(s) 112 can analyze the transaction information to identity connections between the first merchant and at least one other merchant, such as the second merchant. The connections can include general connections and interrelated connections. For instance, the computing device(s) 112 can identify an interrelated connection between the first merchant and the second merchant based on the first customer conducting the first transaction at the first merchant followed by the subsequent transaction at the second merchant. The computing device(s) 112 can then generate the recommendation based on the connection between the first merchant and the second merchant.

In some instances, the computing device(s) 112 can utilize one or more factors to determine whether to generate the recommendation. For instance, at 418, the computing device(s) may generate the recommendation when the connection indicates that a threshold number of customers conduct respective transactions at the first merchant followed by respective transactions at the second merchant. Additionally or alternatively, at 420, the computing device(s) 112 may generate the recommendation when the transaction information (and/or a profile associated with the second merchant) indicates that the second customer has not conducted a transaction with the second merchant. Additionally or alternatively, at 422, the computing device(s) 112 may generate the recommendation when there is a business connection between the first merchant and the second merchant. For instance, the computing device(s) 112 may generate the recommendation based on the first merchant and the second merchant providing a similar category of item(s)/service(s) and/or based on the first merchant and the second merchant providing related item(s)/service(s).

At 424, the computing device(s) 112 send a message that includes the recommendation. In some instances, the computing device(s) 112 can send the message to the merchant device associated with the first merchant. The merchant device can then receive the message from the computing device(s) 112 and provide the message to the customer. In some instances, the computing device(s) 112 can send the message to the customer using contact information associated with the customer. The customer device associated with the customer can then receive the message from the computing device(s) 112 and provide the message to the customer.

Figure 5:
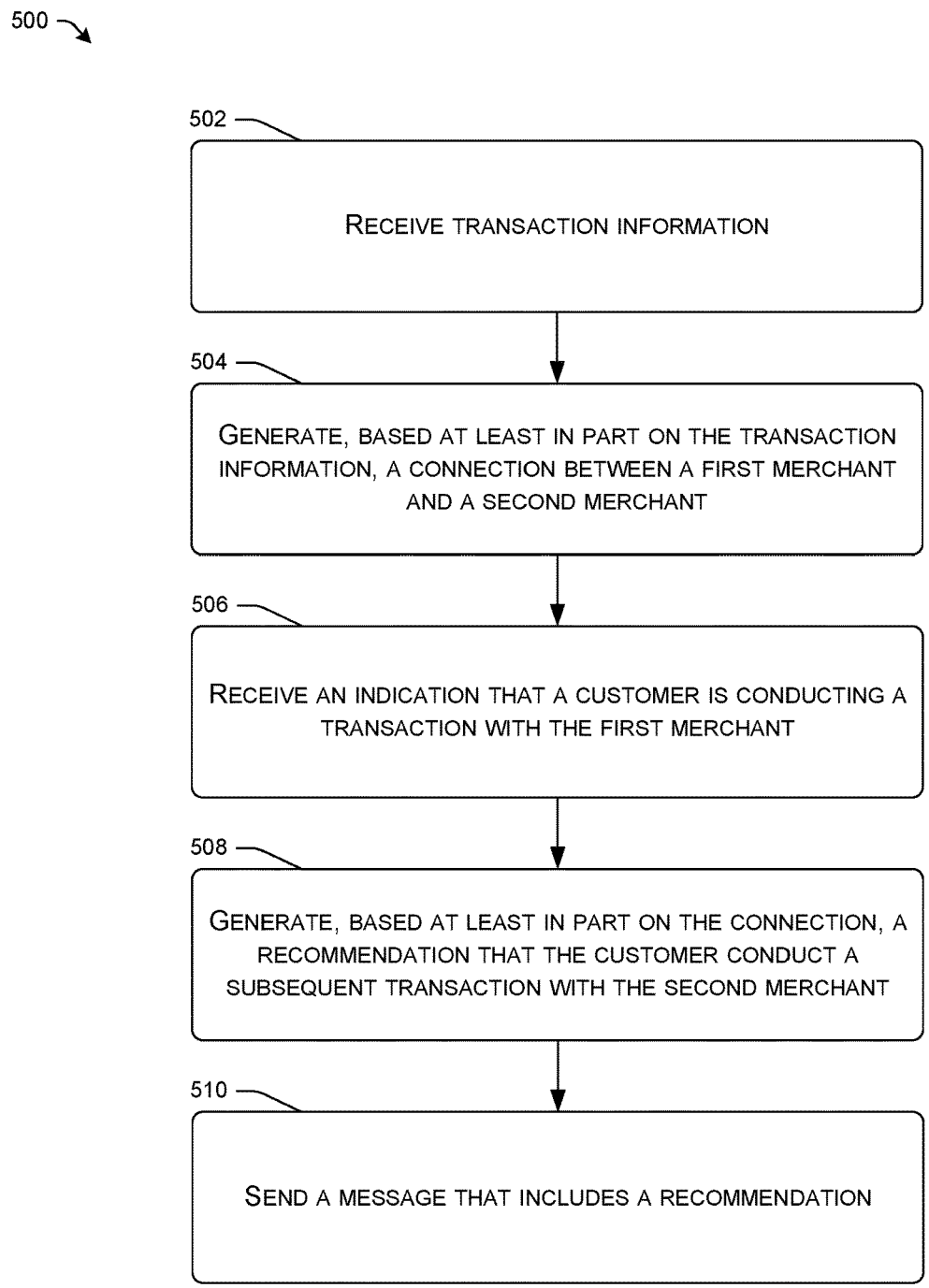
FIG. 5 illustrates a flow diagram of an example process for generating a connection between merchants, and then using the connection to send a customer a recommendation.

FIG. 5 illustrates a flow diagram of an example process 500 for generating a connection between merchants, and then using the connection to send a customer a recommendation. At 502, the computing device(s) 112 receive transaction information. For instance, the computing device(s) 112 can receive transaction information from merchant device(s) associated with respective merchant(s). As discussed above, the transaction information can include both buyer information and item information that describes transactions between the merchant(s) and customer(s).

At 504, the computing device(s) 112 generate, based at least in part on the transaction information, a connection between a first merchant and a second merchant. In some instances, the connection can include a general connection. For instance, the computing device(s) 112 can generate a connection based on at least one customer conducting respective transactions at the first merchant and the second merchant. In some instances, the connection may include an interrelated connection. For instance, the computing device(s) 112 may generate the connection based on at least one customer conducting a first transaction at the first merchant and, after conducting the first transaction, conducting a second transaction (e.g., subsequent transaction) at the second merchant.

At 506, the computing device(s) 112 receive an indication that a customer is conducting a transaction at the first merchant. For instance, the computing device(s) 112 can receive a request to authorize a payment instrument of the customer for a cost of the transaction. In some instances, the computing device(s) 112 receive the request from a merchant device associated with the merchant. In some instances, the computing device(s) 112 receive the request from a customer device associated with the customer.

At 508, the computing device(s) 112 generate, based at least in part on the connection, a recommendation that the customer conduct a subsequent transaction at the second merchant. For instance, the computing device(s) 112 can determine, based on the connection, that one or more customers that conduct respective transactions at the first merchant conduct subsequent transactions at the second merchant. Based on the determination, the computing device(s) can generate the recommendation to perform the subsequent transaction at the second merchant. In some instances, the computing device(s) 112 may further determine that the customer has not conducted a transaction at the second merchant, where the recommendation is further generated based on the customer not conducting a transaction at the second merchant. In some instances, the computing device(s) 112 may further generate the recommendation based on geographical locations of each of the first merchant and the second merchant and/or types of business associated with each of the first merchant and the second merchant.

At 510, the computing device(s) 112 send a message that includes the recommendation. In some instances, the computing device(s) 112 can send the message to the merchant device associated with the first merchant. The merchant device can then receive the message from the computing device(s) 112 and provide the message to the customer. In some instances, the computing device(s) 112 can send the message to the customer using contact information associated with the customer. The customer device associated with the customer can then receive the message from the computing device(s) 112 and provide the message to the customer.

Figure 6:
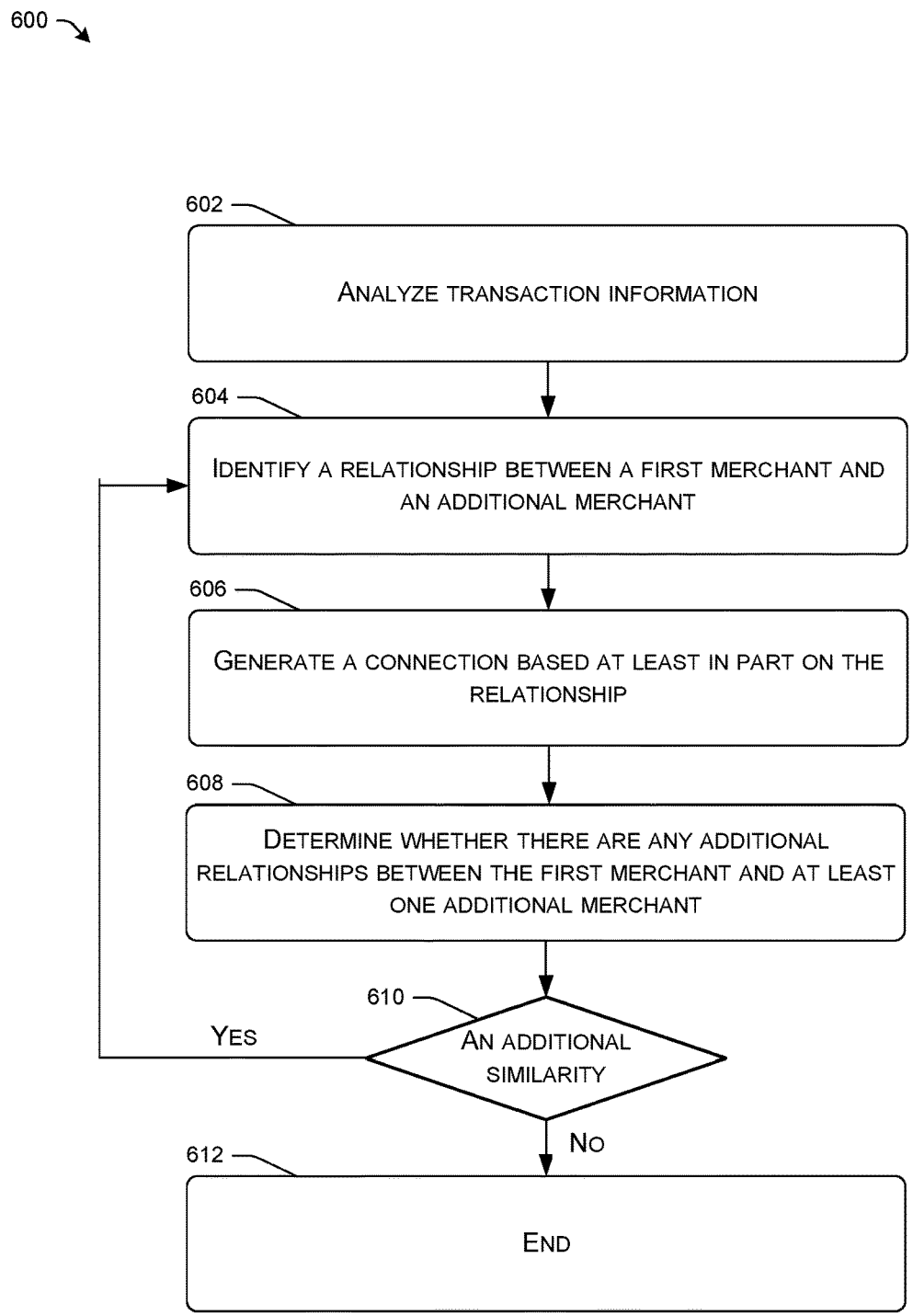
FIG. 6 illustrates a flow diagram of an example process for generating connection(s) between merchants.

FIG. 6 illustrates a flow diagram of an example process 600 for generating connections between merchants. At 602, the computing device(s) 112 analyze transaction information. For instance, the computing device(s) 112 can receive transaction information from merchant devices of respective merchants, where in the transaction information describes transactions between merchants and customers. The computing device(s) 112 can then analyze the transaction information using one or more algorithms that identify one or more similarities between transactions that are described by the transaction information. For instance, the one or more algorithms can identify transactions that include a similar merchant, a similar customer, similar payment information associated with a payment instrument used by the customer, similar item(s)/service(s) acquired by the customer, a similar cost of the item(s)/service(s) acquired by the customer, a similar time, place and date, and so forth.

At 604, the computing device(s) 112 identify a relationship between a first merchant and an additional merchant. For instance, based on the one or more similarities, the computing device(s) 112 can identify the relationship between the first merchant and a second merchant. In some instances, the relationship can include that the first merchant and the second merchant each conducted a respective transaction with at least one customer. In some instances, the relationship can include that the first merchant and the second merchant each conducted a respective transaction with a threshold number of customers.

At 606, the computing device(s) 112 generate a recommendation based at least in part on the relationship. For example, the computing device(s) 112 can generate a general connection based on the first merchant and the second merchant each conducting a respective transaction with the at least one customer. For instance, the general relationship can thus indicate that at least one customer has conducted a respective transaction with each of the first merchant and the second merchant. For another example, the computing device(s) 112 can additionally, or alternatively, generate an interrelated connection based on the first merchant and the second merchant each conducting a respective transaction with the at least one customer, and based on an order in which the respective transactions were conducted. For instance, the interrelated connection can indicate that at least one customer has conducted a first transaction at the first merchant and, after conducting the first transaction, conducted a subsequent transaction at the second merchant.

At 608, the computing device(s) determine whether there are any additional relationships between the first merchant and at least one additional merchant. For instance, based on the one or more similarities, the computing device(s) 112 can determine whether there are any additional relationships between the first merchant and at least one additional merchant. If at 610 the computing device(s) 112 determine there is at least one additional similarity, the computing device(s) 112 can begin back at step 604 in order to generate another connection. For instance, the computing device(s) 112 can identify a relationship between the first merchant and a third merchant, and then generate a connection between the first merchant and the third merchant based on the relationship.

However, if at 610 the computing device(s) 112 determine there are no additional similarities, the process 700 ends at 612. In some instances, at 612, the computing device(s) 112 stop analyzing the transaction information. In some instances, the computing device(s) 112 may then again analyze the transaction information after the occurrence of an event. For instance, the computing device(s) 112 may again analyze the transaction information after receiving additional transaction describing another transaction, after a specific timer interval, in response to receiving input, and/or the like.

Figure 7:
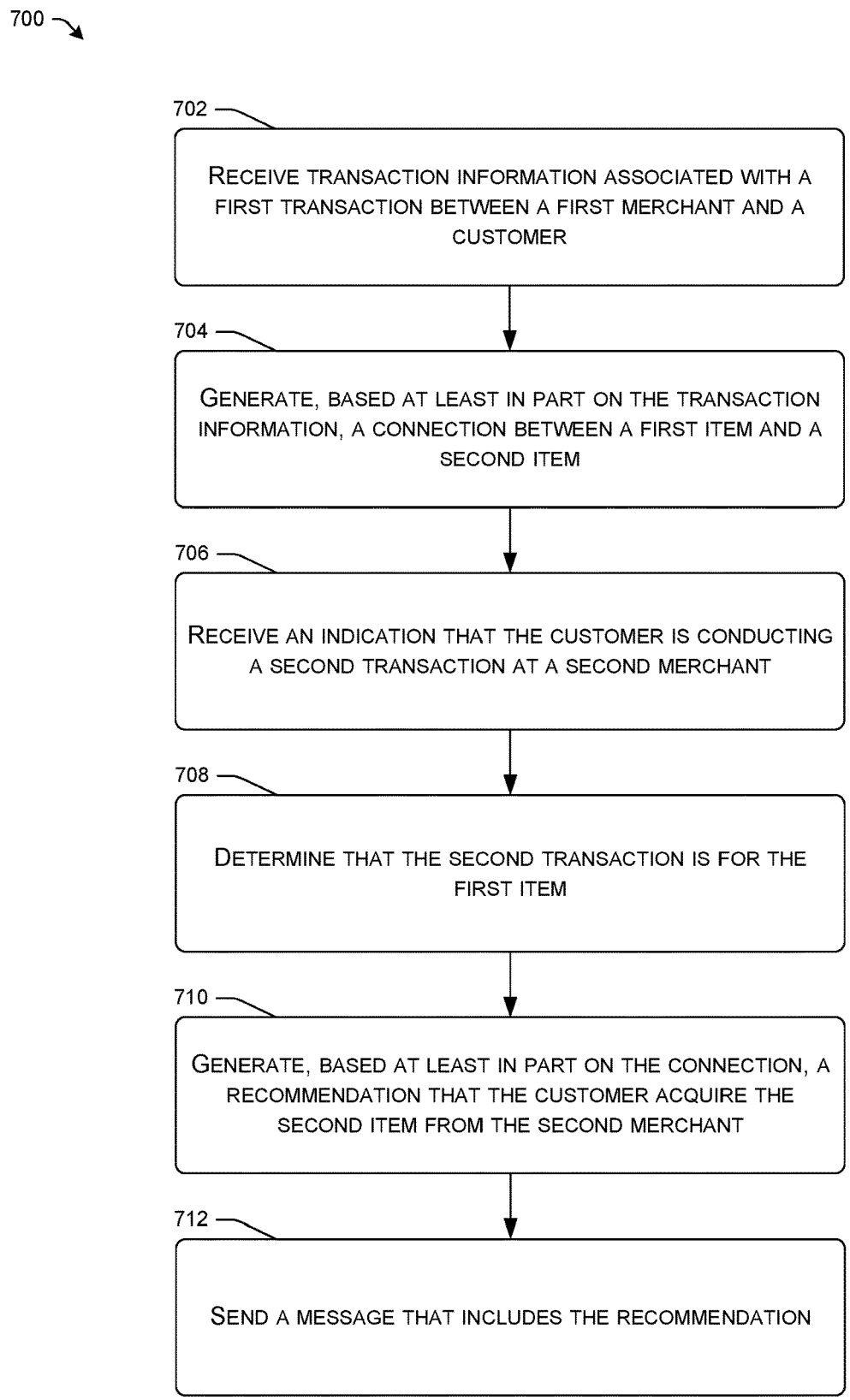
FIG. 7 illustrates a flow diagram of an example process for performing data analysis in order generate a connection between items. The example process further includes sending a recommendation to a customer based on the connection.

FIG. 7 illustrates a flow diagram of an example process 700 for performing data analysis in order generate a connection between items, and then sending a recommendation to a customer based on the connection. At 702, the computing device(s) 112 receive transaction information associated with a first transaction between a first merchant and a customer. For instance, the computing device(s) 112 can receive transaction information from a merchant device associated with the first merchant. The transaction information can indicate an identifier of the first merchant, an identifier (e.g., name) of the customer, the first and second items, and so forth.

At 704, the computing device(s) 112 generate, based at least in part on the first information, a connection between the first item and the second item. For instance, the computing device(s) 112 can analyze the transaction information to identity that the first transaction is for the first item and the second item. The computing device(s) 112 can then generate a connection between the first item and the second item. In some instances, the computing device(s) 112 then store the connection in association with an identity of the customer. For instance, the computing device(s) 112 can store the connection in association with a profile of the customer.

At 706, the computing device(s) 112 receive an indication that the customer is conducting a second transaction at a second merchant. For instance, the computing device(s) 112 can receive a request to authorize a payment instrument of the customer for a cost of the second transaction. The request can include at least an identity of the first item. In some instances, the computing device(s) 112 receive the request from a merchant device associated with the second merchant. In some instances, the computing device(s) 112 receive the request from a customer device associated with the customer.

At 708, the computing device(s) 112 determine that the second transaction is for the first item and at 710, the computing device(s) 112 generates, based at least in part on the connection, a recommendation that the customer acquire the second item from the second merchant. For instance, the computing device(s) 112 can determine that the second transaction is for the first item based on the indication. For instance, the indication may include an identifier of the first item. The computing device(s) 112 can then identity the connection using an identifier of the first item, and use the connection to generate the recommendation for the customer. In some instances, the computing device(s) 112 first determine that the second merchant provides the second item and, based on the determination and the connection, generates the recommendation for the customer.

At 710, the computing device(s) 112 send a message that includes the recommendation. In some instances, the computing device(s) 112 can send the message to the merchant device associated with the second merchant. The merchant device can then receive the message from the computing device(s) 112 and provide the message to the customer. In some instances, the computing device(s) 112 can send the message to the customer using contact information associated with the customer. The customer can then receive the message using a customer device. Based on receiving the message, the customer device can provide the message to the customer.

It should be noted that the processes above describe transactions that occur at merchant locations of the respective merchants. However, in some instances, the transactions may include transactions at the physical stores of the merchants, online transactions in which customers are acquiring item(s) and/or service(s) from merchants via online marketplaces associated with the respective merchants, or any combination thereof. For instance, based on a customer conducting an online transaction with a merchant, the computing device(s) 112 can send the customer one or more messages that recommend a merchant for conducting a subsequent transaction and/or recommend one more additional item(s)/service(s).

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method implemented by a server device associated with a payment-processing system, the method comprising:
receiving transaction information associated with a plurality of transactions from a plurality of point-of-sale (POS) devices associated with a plurality of merchants that use the payment-processing system for processing payments, the plurality of POS devices each comprising an instance of a POS application that enables an associated POS device to operate as a POS terminal;
processing, by the server device, the plurality of transactions between the plurality of merchants and a plurality of customers;
determining, by the server device and based at least in part on the transaction information, that a first customer conducted a first transaction with a first merchant of the plurality of merchants and a second transaction with a second merchant of the plurality of merchants, the second transaction being subsequent to the first transaction, wherein the first merchant and the second merchant are different merchants;
determining, by the server device and based at least in part on the transaction information, that a second customer conducted a third transaction with the first merchant and a fourth transaction with a third merchant of the plurality of merchants, the fourth transaction being subsequent to the third transaction;
determining, by the server device and based at least in part on the transaction information, that the second customer has not conducted a previous transaction with the second merchant;
receiving, by the server device and from an instance of the POS application associated with the POS device of the plurality of POS devices, a request to process a current transaction between the first merchant and the second customer, wherein the POS device is associated with the first merchant;
generating, by the server device and based at least in part on the first customer conducting the second transaction at the second merchant subsequent to conducting the first transaction at the first merchant and determining that the second customer has not conducted the previous transaction with the second merchant, a recommendation that the second customer conduct a future transaction at the second merchant; and
communicating, by the server device, an electronic notification that includes the recommendation to the POS device associated with the first merchant.

2. The method as claim 1 recites, further comprising:
determining, based at least in part on the transaction information, that a threshold number of customers conducted transactions at the first merchant followed by conducting transactions at the second merchant,
wherein generating the recommendation is further based, at least in part, on determining that the threshold number of customers conducted transactions at the first merchant followed by conducting transactions at the second merchant.

3. The method as claim 1 recites, further comprising:
determining a first geographic location associated with the first merchant;
determining a second geographic location associated with the second merchant; and
determining that the first geographic location is within a threshold distance of the second geographic location,
wherein generating the recommendation is further based, at least in part, on determining that the first geographic location is within the threshold distance of the second geographic location.

4. The method as claim 1 recites, further comprising:
determining that the first merchant is associated with a first type of business;
determining that the second merchant is associated with a second type of business; and
determining that the first type of business corresponds to the second type of business,
wherein generating the recommendation is further based, at least in part, on determining that the first type of business corresponds to the second type of business.

5. The method as claim 1 recites, further comprising:
determining, based at least in part on the transaction information, an amount of time between the first customer conducting the first transaction at the first merchant and the second transaction at the second merchant; and
determining, based at least in part on the amount of time, a specified time for communicating the electronic communication to the second customer; and
sending, based at least in part on the specified time, the electronic communication to a device associated with the second customer.

6. The method as claim 1 recites, further comprising:
associating transaction information for individual transactions of the plurality of transactions with respective buyer profiles of a plurality of buyer profiles;
determining that the first customer and the second customer are each associated with a first buyer profile of the plurality of buyer profiles, the first buyer profile indicating customers that have conducted transactions with the first merchant;
determining that the first customer is associated with a second buyer profile of the plurality of buyer profiles, the second buyer profile indicating customers that have conducted transactions with the second merchant; and
determining that the second customer is not associated with the second buyer profile, wherein generating the recommendation is further based, at least in part, on determining that the second customer is not associated with the second buyer profile.

7. The method as claim 1 recites, further comprising:
receiving, from the POS application of the POS device associated with the first merchant, a request to process a fifth transaction between the first merchant and the first customer;
generating, based at least in part on the second customer conducting the fourth transaction at the third merchant subsequent to conducting the third transaction at the first merchant, an additional recommendation that the first customer conduct a sixth transaction at the third merchant; and
communicating an electronic notification that includes the additional recommendation to at least one of the POS device or a device associated with the first customer.

8. The method as claim 1 recites, further comprising:
determining that the first merchant is associated with a first type of business, wherein the first type of business provides at least one of a first category of items or a first category of services;
determining that the second merchant is associated with a second type of business, wherein the second type of business provides at least one of a second category of items or a second category of services; and
identifying a connection between the first merchant and the second merchant based, at least in part, on the first type of business and the second type of business,
wherein generating the recommendation is further based, at least in part, on identifying the connection.

9. The method as claim 8 recites, wherein identifying the connection comprises at least one of:
determining that transactions for the second category of items occur subsequently to transactions for the first category of items or transactions for the first category of services; or
determining that transactions for the second category of services occur subsequently to transactions for the first category of items or transactions for the first category of services.

10. A system associated with a payment-processing service comprising:
one or more processors; and
one or more computer-readable media storing instructions that, when executed by the one or more processors, cause the one or more processors to perform operations comprising:
receiving, by a payment-processing computing device associated with the payment-processing service, transaction information associated with a plurality of transactions from a plurality of point-of-sale (POS) devices associated with a plurality of merchants that use the payment-processing service for processing payments;
processing, by the payment-processing computing device, the plurality of transactions between the plurality of merchants and a plurality of customers;
determining, by the payment-processing computing device and based at least in part on the transaction information, that a first customer conducted a first transaction with a first merchant that uses the payment-processing service and a second transaction with a second merchant that uses the payment-processing service, the second transaction occurring after the first transaction;
determining, by the payment-processing computing device and based at least in part on the transaction information, that a second customer conducted a third transaction with the first merchant and a fourth transaction with a third merchant that uses the payment-processing service, the fourth transaction occurring after the third transaction;
receiving, by the payment-processing computing device, an indication that the second customer is conducting a current transaction at the first merchant;
processing the current transaction between the second customer and the first merchant;
determining, based at least in part on the first customer conducting the second transaction at the second merchant after the first transaction at the first merchant, to recommend that the second customer conduct a future transaction at the second merchant;
sending, to a POS device associated with the second merchant, a first electronic communication to indicate whether to provide a recommendation to conduct a future transaction at the second merchant to the second customer;
receiving, from the POS device associated with the second merchant, a second electronic communication comprising a request that the recommendation be provided to the second customer, and
sending, to a computing device associated with the second customer and based at least in part on the request, a third electronic communication comprising the recommendation.

11. The system as claim 10 recites, the operations further comprising:
determining, based at least in part on the transaction information, that a threshold number of customers conducted transactions at the first merchant followed by conducting transactions at the second merchant,
wherein determining to recommend that the second customer conduct the future transaction at the second merchant is further based, at least in part, on determining that the threshold number of customers conducted transactions at the first merchant followed by conducting transactions the second merchant.

12. The system as claim 10 recites, the operations further comprising:
determining that the transaction information does not indicate that the second customer conducted a transaction at the second merchant,
wherein determining to recommend that the second customer conduct the future transaction at the second merchant is further based, at least in part, on determining that the transaction information does not indicate that the second customer conducted a transaction at the second merchant.

13. The system as claim 10 recites, the operations further comprising:
determining a first geographic location associated with the first merchant;
determining a second geographic location associated with the second merchant; and
determining that the first geographic location is within a threshold distance of the second geographic location,
wherein determining to recommend that the second customer conduct the future transaction at the second merchant is further based, at least in part, on determining that the first geographic location is within the threshold distance of the second geographic location.

14. The system as claim 10 recites, the operations further comprising:
- determining, based at least in part on the transaction information, an amount of time between the first customer conducting the first transaction at the first merchant and the first customer conducting the second transaction at the second merchant; and
- determining, based at least in part on the amount of time, a specified time for sending the electronic communication,
- wherein the third electronic communication is sent based at least in part on the specified time.

15. The system as claim 10 recites, the operations further comprising:
- determining that the first merchant is associated with a first type of business, wherein the first type of business provides at least one of a first category of items or a first category of services;
- determining that the second merchant is associated with a second type of business, wherein the second type of business provides at least one of a second category of items or a second category of services; and
- identifying a connection between the first merchant and the second merchant based, at least in part, on the first type of business and the second type of business,
- wherein determining to recommend that the second customer conduct the future transaction at the second merchant is further based, at least in part, on identifying the connection.

16. A non-transitory computer-readable medium storing instructions executable by the one or more processors associated with a payment-processing system, wherein the instructions program the one or more processors to:
- receive transaction information associated with a plurality of transactions from a plurality of point-of-sale (POS) devices associated with a plurality of merchants that use the payment-processing system for processing payments;
- process, by the payment processing system, the plurality of transactions;
- determine, by the payment-processing system and based at least in part on the transaction information, that a first customer conducted a first transaction with a first merchant that uses the payment-processing system and a second transaction with a second merchant that uses the payment-processing system, the second transaction being subsequent to the first transaction, wherein the first merchant and the second merchant are different merchants;
- determine, by the payment-processing system and based at least in part on the transaction information, that a second customer conducted a third transaction with the first merchant and a fourth transaction with a third merchant that uses the payment-processing system, the fourth transaction being subsequent to the third transaction;
- determine, by the payment-processing system and based at least in part on the transaction information, that the second customer has not conducted a previous transaction with the second merchant;
- receive, by the payment-processing system and from a POS device associated with the first merchant, a request to process a current transaction between the first merchant and the second customer;
- generate, by the payment-processing system and based at least in part on the first customer conducting the second transaction at the second merchant subsequent to conducting the first transaction at the first merchant and determining that the second customer has not conducted the previous transaction with the second merchant, a recommendation that the second customer conduct a future transaction at the second merchant; and
- send, by the payment-processing system and to the POS device associated with the first merchant, the recommendation for presentation to the second customer.

17. The non-transitory computer-readable medium as claim 16 recites, wherein the instructions further program the one or more processors to:
- send, to a POS device associated with the second merchant, a first electronic communication inquiring whether the second merchant would like the recommendation to be provided to the second customer; and
- receive, from the POS device associated with the second merchant, a second electronic communication requesting that the recommendation be provided to the second customer; and
- send the recommendation to a device associated with the second customer based at least in part on the second electronic communication.

18. The non-transitory computer-readable medium as claim 16 recites, wherein the instructions further program the one or more processors to:
- determine, based at least in part on the transaction information, that a threshold number of customers conducted transactions at the first merchant followed by conducting transactions at the second merchant,
- wherein sending the recommendation is based at least in part on determining that the threshold number of customers conducted transactions at the first merchant followed by conducting transactions at the second merchant.

19. The non-transitory computer-readable medium as claim 16 recites, wherein the instructions further program the one or more processors to:
- determine a first geographic location associated with the first merchant;
- determine a second geographic location associated with the second merchant; and
- determine that the first geographic location is within a threshold distance of the second geographic location,
- wherein sending the recommendation is based at least in part on determining that the first geographic location is within the threshold distance of the second geographic location.

20. The non-transitory computer-readable medium as claim 16 recites, wherein the instructions further program the one or more processors to:
- send the recommendation to a device associated with the second customer.

* * * * *